US009633377B2

(12) United States Patent
Nakagawa

(10) Patent No.: US 9,633,377 B2
(45) Date of Patent: *Apr. 25, 2017

(54) IMAGE CONTENT AND ADVERTISEMENT DATA PROVIDING METHOD, SYSTEM, AND APPARATUS

(71) Applicant: SONY CORPORATION, Tokyo (JP)

(72) Inventor: Susumu Nakagawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/613,974

(22) Filed: Feb. 4, 2015

(65) Prior Publication Data
US 2015/0149300 A1 May 28, 2015

Related U.S. Application Data

(63) Continuation of application No. 14/179,636, filed on Feb. 13, 2014, now Pat. No. 8,978,061, which is a
(Continued)

(30) Foreign Application Priority Data

Jun. 12, 2000 (JP) ................................. 2000-180757

(51) Int. Cl.
H04N 7/10 (2006.01)
G06Q 30/00 (2012.01)
(Continued)

(52) U.S. Cl.
CPC ..... G06Q 30/0269 (2013.01); G06Q 30/0241 (2013.01); H04L 65/60 (2013.01);
(Continued)

(58) Field of Classification Search
CPC ........... H04N 21/23424; H04N 21/234; H04N 21/25866; H04N 21/25891
(Continued)

(56) References Cited

U.S. PATENT DOCUMENTS 5,515,098 A 5/1996 Carles
5,530,754 A 6/1996 Garfinkle
(Continued)

FOREIGN PATENT DOCUMENTS

EP 424 648 9/1990
JP 9-51522 2/1997
(Continued)

OTHER PUBLICATIONS

Japanese Office Action dated Jan. 12, 2010.
Claria Company Information and Claria Products and Services, www.claria.com.

Primary Examiner — James R Sheleheda
(74) Attorney, Agent, or Firm — Haug Partners LLP; William S. Frommer

(57) ABSTRACT

To provide an image contest providing method capable promoting advertisement effect by dynamically inserting an advertisement image to a distributed image content, an image content reproducing apparatus requests an image content providing apparatus to distribute the image content. Then, the image content is distributed to the image content reproducing apparatus and a viewer can utilize the image content. At this occasion, the image content providing apparatus distributes the image content, detects an advertisement inserting position and requests an advertisement image providing apparatus to distribute an advertisement image. Then, the advertisement image providing apparatus selects the advertisement a image to be inserted to the image content and transmits thereof to the image content providing apparatus. Thereafter, the image content providing apparatus inserts the advertisement image to a position of the image content for inserting the advertisement and distribute thereof the image content reproducing apparatus.

12 Claims, 20 Drawing Sheets

Related U.S. Application Data continuation of application No. 13/234,873, filed on Sep. 16, 2011, now Pat. No. 8,707,353, which is a continuation of application No. 09/878,581, filed on Jun. 11, 2001, now Pat. No. 8,161,508.

(51) Int. Cl.

| | | |
|---|---|---|
| *G06Q 30/02* | (2012.01) | |
| *H04N 21/234* | (2011.01) | |
| *H04N 21/258* | (2011.01) | |
| *H04N 7/173* | (2011.01) | |
| *H04N 21/2668* | (2011.01) | |
| *H04N 21/441* | (2011.01) | |
| *H04N 21/462* | (2011.01) | |
| *H04N 21/472* | (2011.01) | |
| *H04N 21/4782* | (2011.01) | |
| *H04N 21/658* | (2011.01) | |
| *H04N 21/81* | (2011.01) | |
| *H04N 21/8352* | (2011.01) | |
| *H04L 29/06* | (2006.01) | |

(52) U.S. Cl.
CPC ... *H04N 7/17318* (2013.01); *H04N 21/23424* (2013.01); *H04N 21/25891* (2013.01); *H04N 21/2668* (2013.01); *H04N 21/441* (2013.01); *H04N 21/4622* (2013.01); *H04N 21/472* (2013.01); *H04N 21/4782* (2013.01); *H04N 21/6582* (2013.01); *H04N 21/812* (2013.01); *H04N 21/8352* (2013.01)

(58) Field of Classification Search
USPC .................................. 725/34, 35; 705/14.66
See application file for complete search history.

(56) References Cited

U.S. PATENT DOCUMENTS

| | | | |
|---|---|---|---|
| 5,630,119 A | 5/1997 | Aristides et al. | |
| 5,774,170 A | 6/1998 | Hite et al. | |
| 5,826,165 A * | 10/1998 | Echeita | H04H 20/14 |
| | | | 348/903 |
| 5,872,588 A | 2/1999 | Aras et al. | |
| 6,141,010 A | 10/2000 | Hoyle | |
| 6,173,271 B1 * | 1/2001 | Goodman | G06Q 20/102 |
| | | | 348/E7.031 |
| 6,434,747 B1 | 8/2002 | Khoo et al. | |
| 6,505,169 B1 | 1/2003 | Bhagavath et al. | |
| 6,698,020 B1 | 2/2004 | Zigmond et al. | |
| 6,718,551 B1 | 4/2004 | Swix et al. | |
| 6,820,277 B1 | 11/2004 | Eldering et al. | |
| 6,986,156 B1 * | 1/2006 | Rodriguez | H04H 20/10 |
| | | | 348/E17.005 |
| 7,039,930 B1 | 5/2006 | Goodman et al. | |
| 7,054,949 B2 | 5/2006 | Jennings | |
| 7,277,870 B2 * | 10/2007 | Mourad | G06F 17/3089 |
| | | | 380/200 |
| 7,394,850 B1 | 7/2008 | Gordon | |
| 7,673,315 B1 | 3/2010 | Wong et al. | |
| 7,949,565 B1 | 5/2011 | Eldering et al. | |
| 7,979,880 B2 | 7/2011 | Hosea et al. | |
| 8,108,245 B1 | 1/2012 | Hosea et al. | |
| 8,161,508 B2 * | 4/2012 | Nakagawa | G06Q 30/0269 |
| | | | 725/110 |
| 8,418,195 B1 | 4/2013 | Page et al. | |
| 8,707,353 B2 * | 4/2014 | Nakagawa | 725/35 |
| 8,978,061 B2 * | 3/2015 | Nakagawa | 725/35 |
| 2001/0016942 A1 * | 8/2001 | Harrison | G06F 1/1613 |
| | | | 725/36 |
| 2001/0020242 A1 | 9/2001 | Gupta et al. | |
| 2001/0023436 A1 * | 9/2001 | Srinivasan et al. | 709/219 |
| 2001/0042249 A1 | 11/2001 | Knepper et al. | |
| 2001/0056573 A1 * | 12/2001 | Kovac | G06Q 30/02 |
| | | | 725/32 |
| 2002/0019831 A1 | 2/2002 | Wade | |
| 2002/0059094 A1 | 5/2002 | Hosea et al. | |
| 2002/0078444 A1 | 6/2002 | Krewin et al. | |
| 2002/0124249 A1 | 9/2002 | Shintani et al. | |
| 2002/0141491 A1 | 10/2002 | Corts et al. | |
| 2004/0255336 A1 * | 12/2004 | Logan | H04H 20/28 |
| | | | 725/135 |
| 2006/0031405 A1 | 2/2006 | Goldman et al. | |
| 2008/0052171 A1 | 2/2008 | Eldering | |
| 2011/0225046 A1 | 9/2011 | Eldering et al. | |
| 2013/0263179 A1 | 10/2013 | Dow et al. | |
| 2014/0101696 A1 | 4/2014 | Stefanik et al. | |

FOREIGN PATENT DOCUMENTS

| | | |
|---|---|---|
| JP | 10-32655 | 2/1998 |
| JP | 11-96237 | 4/1999 |
| JP | 11-331812 | 11/1999 |
| JP | 2002-518946 | 6/2002 |
| JP | 2003-527644 | 9/2003 |
| WO | WO 9926415 A1 | 5/1999 |
| WO | WO 99 55066 | 10/1999 |
| WO | WO 0110126 A1 | 2/2001 |

* cited by examiner

TITLE INFORMATION IT

INFORMATION CATEGORY ~IT2

1:INFORMATION/NEWS
2:EDUCATION
3:BUSINESS
4:MOVIE/MUSIC/DRAMA
5:SPORT
6:VARIETY SHOW
7:MEDICAL SERVICE/HEALTH
8:GOURMET/COOKING
9:LEISURE/TRAVEL
10:OTHERS

FIG.4A

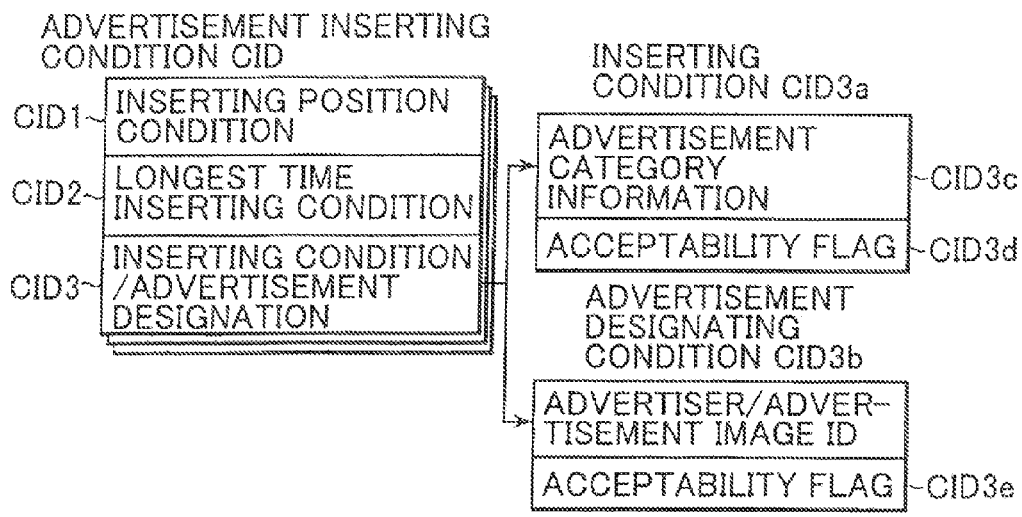

FIG.4B

ADVERTISEMENT CATEGORY INFORMATION CID3c

1:ENERGY,MATERIAL,MACHINE
2:FOOD,BEVERAGE,TASTE GOODS
3:MEDICINE,MEDICAL ARTICLES
4:COSMETICS,FASHION,ACCESSORIES
5:PRECISION MACHINE,STATIONERY
6:HOUSEHOLD ELECTRIC APPLIANCE,AV APPARATUS
7:AUTOMOBILE,RELATED PRODUCTS
8:HOUSEHOLD ARTICLES,TASTE,SPORTSWARE
9:REAL ESTATE,HOUSEHOLD FACILITY
10:PUBLICATION
11:INFORMATION,COMMUNICATION
12:CIRCULATION,RETAIL
13:FINANCE,BOND,INSURANCE
14:TRAFFIC,LEISURE
15:DINING-OUT,SERVICE
16:GOVERNMENT,ORGANIZATION
17:EDUCATION
18:RELIGION
19:OTHERS

FIG.4C

ACCEPTABILITY FLAG CID3d(CID3e)

0:INSERTABLE ONLY FOR ADVERTISEMENT OF INSERTING CONDITION/ADVERTISEMENT DESIGNATION

1:UNINSERTABLE FOR ADVERTISEMENT OF INSERTING CONDITION/ADVERTISEMENT DESIGNATION

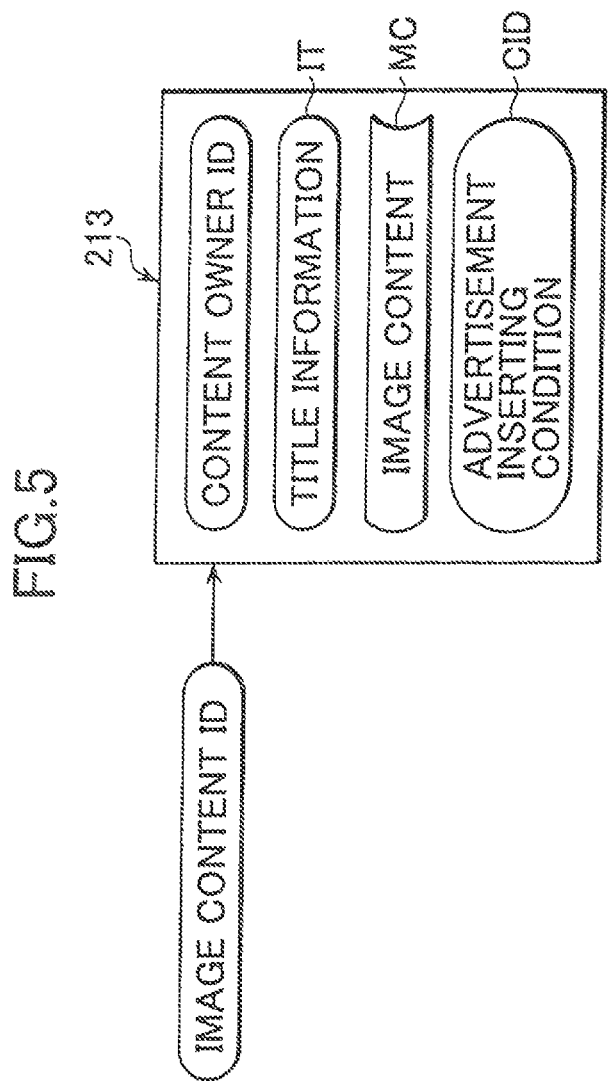

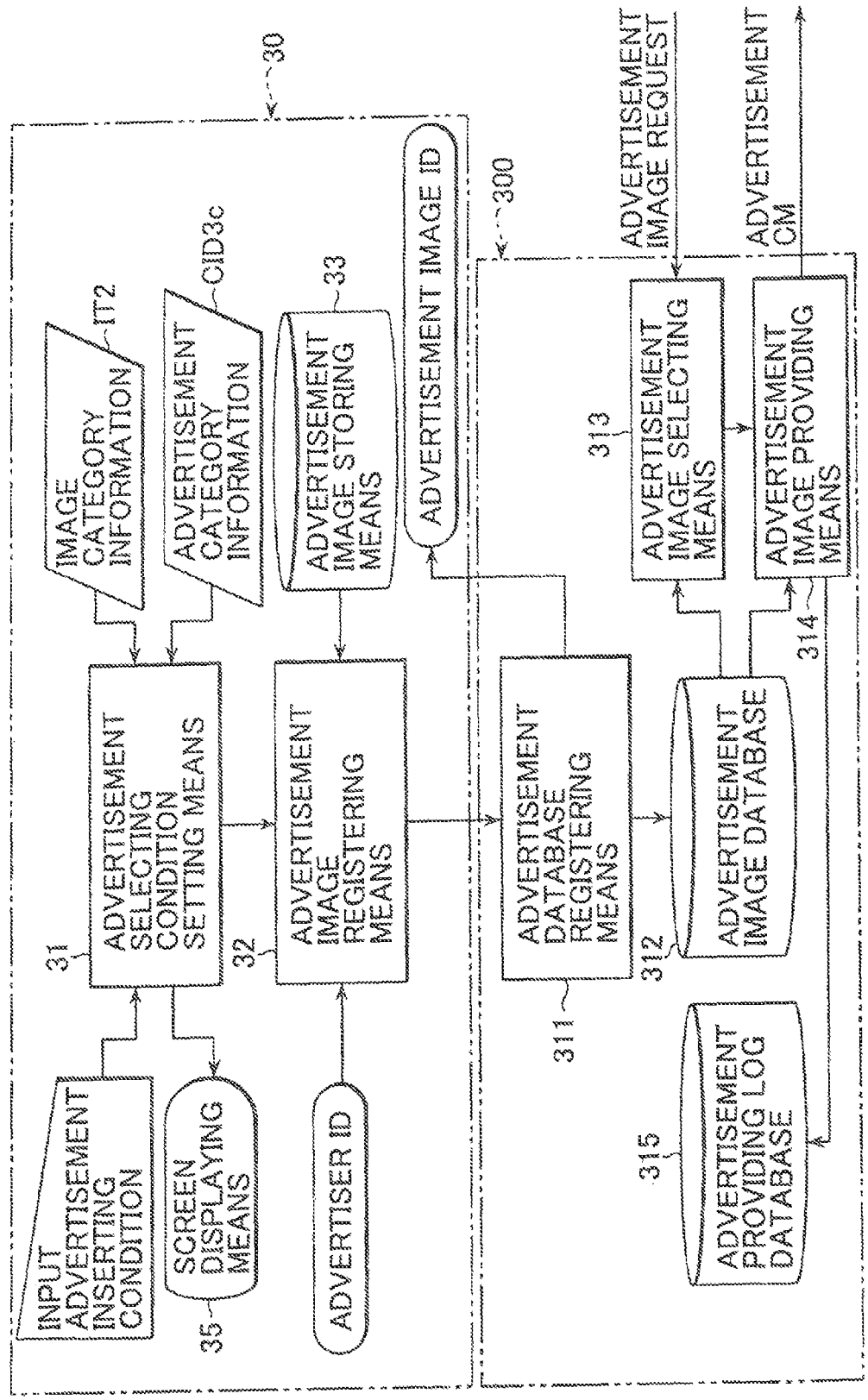

FIG.7A
ADVERTISEMENT INFORMATION CM1

| ADVERTISEMENT TITLE |
| ADVERTISEMENT CATEGORY |
| ADVERTISEMENT IMAGING TIME |
| MAXIMUM NUMBER OF TIMES OF DISTRIBUTION |
| DISTRIBUTION PERIOD |

FIG.7B
ADVERTISEMENT SELECTING CONDITION CMC

| CONDITION KIND | — CMC1 |
| CONDITION DATA | — CMC2 |
| WEIGHTING | — CMC3 |

FIG.7C

CONDITION KIND
1:GENDER
2:GENERATION
3:OCCUPATION
4:AREA
5:TIME BAND
6:DAY OF WEEK
7:IMAGE CATEGORY

WEIGHTING
0:NONE
±1~9:WEIGHTING COEFFICIENT

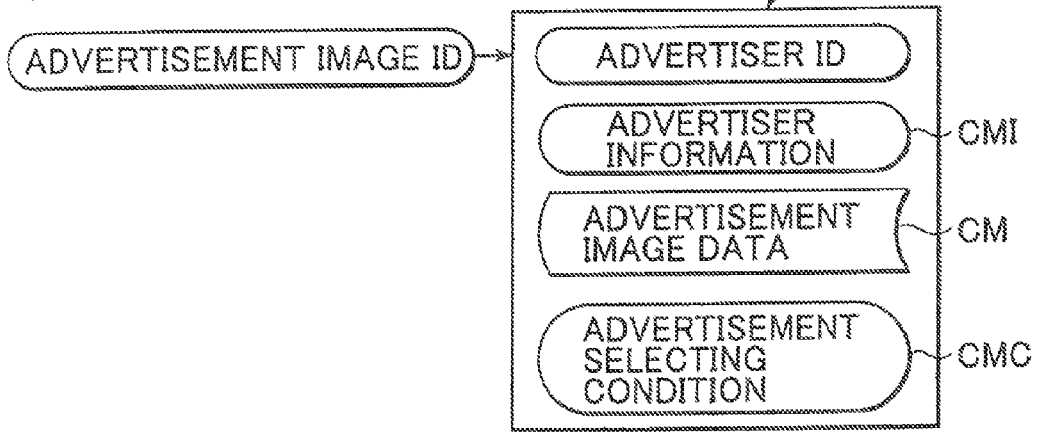

FIG.8

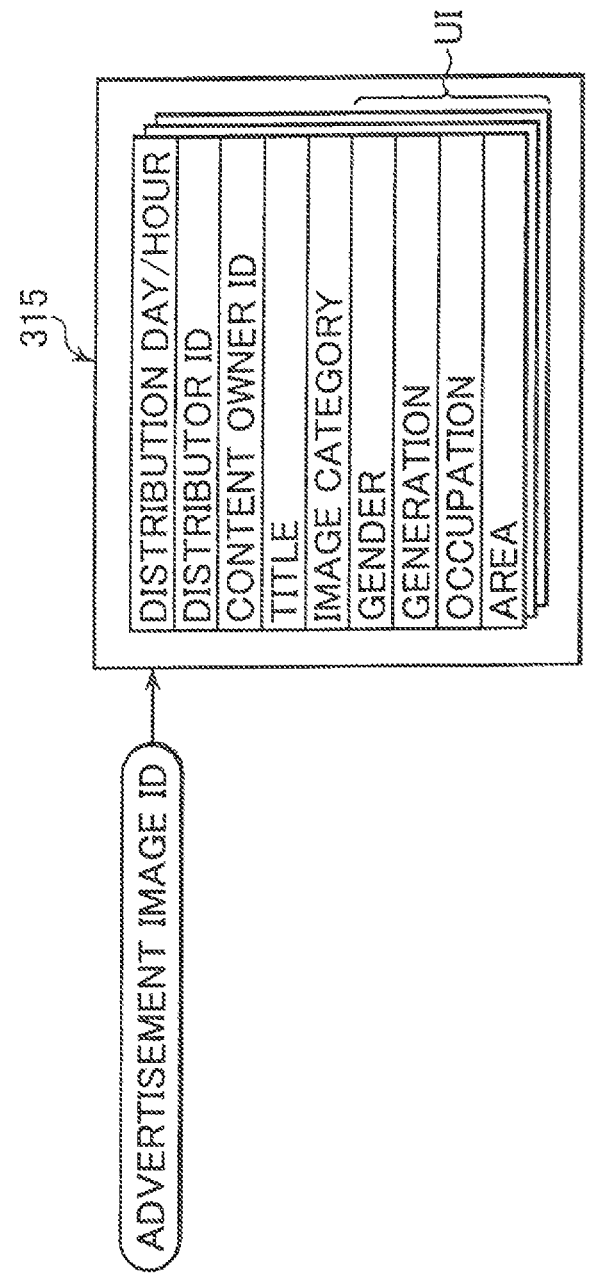

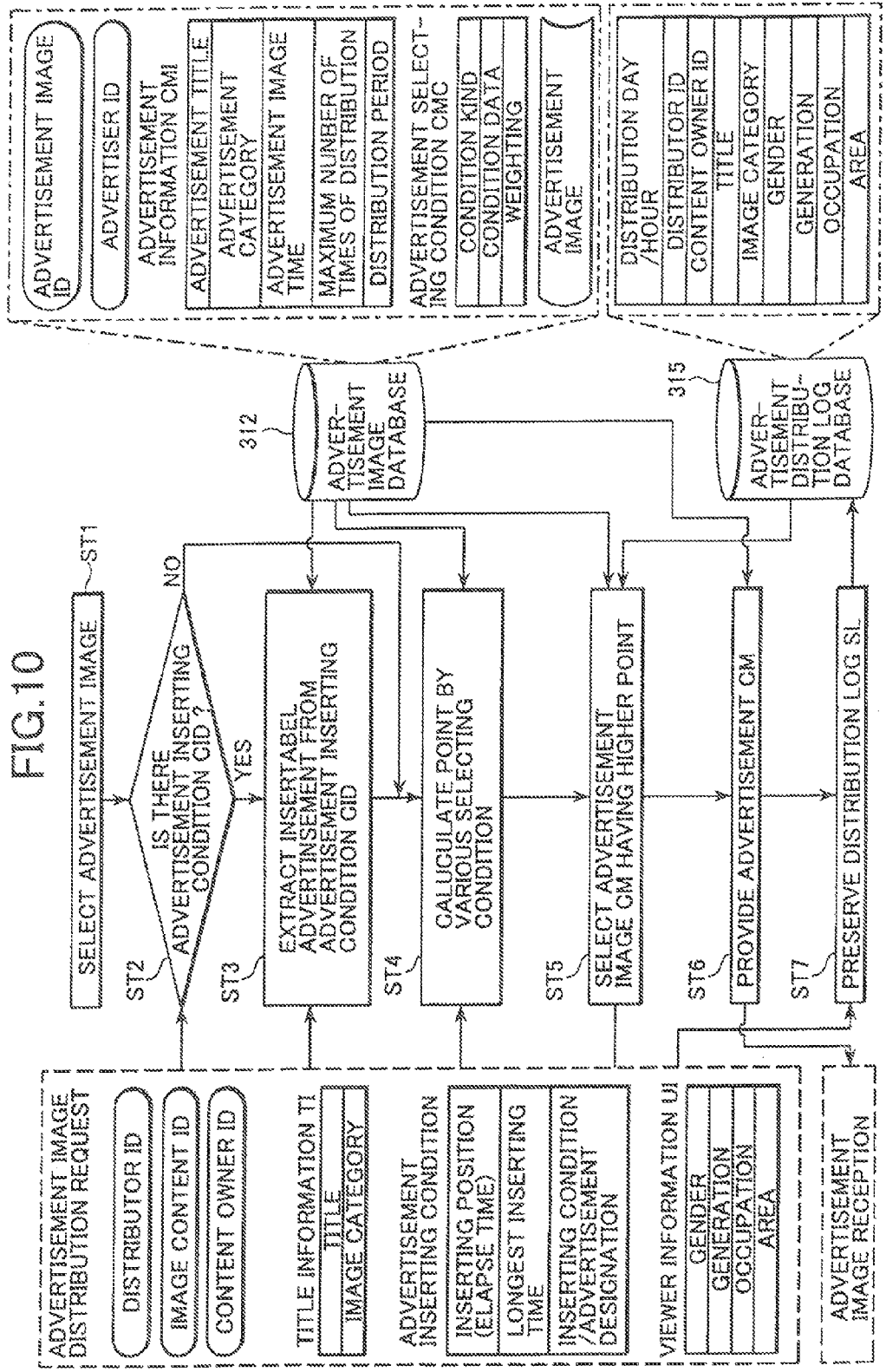

IMAGE CONTENT AND ADVERTISEMENT DATA PROVIDING METHOD, SYSTEM, AND APPARATUS

This is a Continuation of application Ser. No. 14/179,636, filed Feb. 13, 2014, which is a Continuation of application Ser. No. 13/234,873, filed Sep. 16, 2011, now U.S. Pat. No. 8,707,353 issued on Apr. 22, 2014, which is a Continuation of application Ser. No. 09/878,581, filed Jun. 11, 2001, now U.S. Pat. No. 8,161,508 issued on Apr. 17, 2012, which is entitled to the priority filing date of Japanese application no. 2000-180757, filed Jun. 12, 2000, the entirety of which is incorporated herein by reference.

BACKGROUND OF THE INVENTION

Field of the Invention

The present invention relates to an image content providing method of providing image content such as movie or animation to a viewer, an image content providing system, an image content providing apparatus, a program storage medium stored with a program providing image content, an advertisement image providing apparatus, a program storage medium stored with a program providing an advertisement image, an image content reproducing apparatus, a program storage medium stored with a program reproducing image content, an advertisement charge totalizing system, an advertisement charge totalizing method and a program storage medium stored with a program totalizing advertisement charge.

Description of the Related Art

Conventionally, according to advertisement in the Internet, the main current is constituted by advertisement referred to as so-to-speak banner advertisement pasting an image on a screen referred to as browser and sponsorship of Web site. Such an advertisement is carried out by displaying a stationary image or animation at a surrounding of a WEB screen. Further, there also is a case in which content of advertisement is dynamically changed by viewers or a number of times of displaying an advertisement image.

Meanwhile, in recent years, with high speed formation of a network for utilizing the Internet such as a telephone network or a cable television, there is distributed an image content comprising dynamic image such as movies, animation or live relay. In this case, an image content circulated on the Internet constitutes a single closed content as a product. That is, for example, when an image content is utilized by a personal computer, the image content is formed as a single file. Further, when the file is reproduced by predetermined application, a viewer can see the image content.

As described above, conventionally, an advertisement method on the Internet is carried out by displaying a stationary image or an animation image by banner advertisement. Further, even when banner advertisement is pasted on a so-to-speak browser, there is a case in which a viewer does not view the banner advertisement and there poses a problem that sufficient advertisement effect is not achieved.

Further, in the case of an advertisement method such as banner advertisement for example, only a stationery image or animation can be displayed and therefore, advertisement having high quality cannot be provided. Therefore, there poses a problem that high advertisement effect cannot be achieved such that a viewer views the advertisement and is attracted thereby.

Further, when an advertisement image is provided as single image content, the advertisement image forms a single file. Therefore, in order that a viewer browses the advertisement image, there must be carried out clearly indicating action such as clicking icon of the advertisement image and there poses a problem that there is a case in which the advertisement image is not browsed by a viewer.

Further, described above, an image content is constituted in a closed state as a single file. Therefore, in order to insert an advertisement, image in an image content, it is conceivable to previously form a singe file coupled with an image content and an advertisement image.

However, the advertisement image coupled with the image content becomes obsolete with elapse of time and an advertisement effect of the advertisement image is deteriorated. Further, when an image content is reconstructed ever time of updating an advertisement image, there poses a problem of taking time, labor and cost in forming the image content.

SUMMARY OF THE INVENTION

Hence, it is an object of the invention to solve the above-described problem and provide an image content providing method capable of promoting an advertisement effect by dynamically inserting an advertisement image to a distributed image content, an image content providing system, an image content providing apparatus, a program storage medium stored with a program of providing an image content, an advertisement image providing apparatus, a program storage medium stored with a program for providing an advertisement image, an image content reproducing apparatus, a program storage medium stored with a program for reproducing an image content, an advertisement charge totalizing system, an advertisement charge totalizing method and a program storage medium stored with a program of totalizing an advertisement charge.

According to a first aspect of the invention, the above-described object is achieved by an image content providing method which is an image content providing method of providing an image content from an image content providing apparatus to an image content reproducing apparatus, the image content providing method comprising the steps of requesting to distribute the image content from the image content reproducing apparatus to the image content providing apparatus, transmitting the image content to the image content reproducing apparatus and detecting a position of inserting an advertisement, image in the image content at the image content providing apparatus, requesting an advertisement image providing apparatus having the advertisement image to distribute the advertisement image from the image content providing apparatus, selecting the advertisement image to be inserted to the image content and transmitting thereof to the image content providing apparatus at the advertisement image providing apparatus, and distributing the advertisement image at the position inserting the advertisement image when the image content is distributed from the image content providing apparatus to the image content reproducing apparatus.

Further, according to a second aspect of the invention, the above-described object is achieved by an image content providing system comprising an image content providing apparatus having an image content and having a function of providing the image content, an advertisement image providing apparatus having an advertisement image to be inserted to the image content an having a function of providing the advertisement image, and an image content reproducing apparatus having a function of reproducing the image content and the advertisement image, wherein the image content providing apparatus has a function of inserting the advertisement image transmitted from the advertisement image providing apparatus to the image content and providing the image content and the advertisement image to the image content reproducing apparatus.

According to the constitution of the first or the second aspect of the invention, the image content reproducing apparatus requests the image content providing apparatus to distribute the image content by operation of a viewer. Then, the image content is distributed to the image content reproducing apparatus and the viewer can utilize the image content. At this occasion the image content providing apparatus distributes the image content, detects an advertisement inserting position and requests the advertisement image providing apparatus to distribute the advertisement image.

Then, the advertisement image providing apparatus selects the advertisement image to be inserted to the image content and transmits thereof to the image content providing apparatus. Thereafter, the image content providing apparatus inserts the advertisement image to the position of the image content for inserting the advertisement and distributes thereof to the image content reproducing apparatus.

In this way, the image content providing apparatus provide the viewer with the advertisement image in a state of not being separate from the image content as in banner advertisement but inserted to the image content. Therefore, the viewer is easy to turn one eyes the advertisement image and can utilize the advertisement image having a quality level the that of the image content. Further, the advertisement image inserted to the image content is provided from the advertisement image providing apparatus at respective time and therefore, when the advertisement image to be inserted is updated to a new one, only the advertisement image in the advertisement image providing apparatus may be updated.

According to a third aspect of the invention, the above-described object is achieved by, an image content providing method which is an image content providing method of providing an image content from an image content providing apparatus to an image content reproducing apparatus, the image content providing method comprising the steps of requesting to provide the image content from the image content reproducing apparatus to the image content providing apparatus, providing the requested image content from the image content providing apparatus to the image content reproducing apparatus, detecting a position of inserting an advertisement image in the image content when the image content is reproduced at the image content reproducing apparatus, requesting to distribute the advertisement image from the image content reproducing apparatus to an advertisement image providing apparatus having the advertisement image to be inserted, selecting the advertisement image to be inserted to the image content and distributing thereof to the image content providing apparatus at the advertisement image providing apparatus, and reproducing the advertisement image when the position of inserting the distributed advertisement image is reached in reproducing the image content at the image content reproducing apparatus.

Further, according to a fourth aspect of the invention, the above-described object is achieved by an image content providing system comprising an image content providing apparatus having an image content and having function of providing the image content, an advertisement image providing apparatus having an advertisement image to be inserted to the image content and having a function of providing the advertisement image, and an image content reproducing apparatus having a function of reproducing the image content and the advertisement image, wherein the image content reproducing apparatus has a function of acquiring the advertisement image from the advertisement image providing apparatus and inserting the advertisement image to the image content and reproducing thereof.

According to the constitution, of the third or the fourth aspect of the invention, a viewer requests the image content providing apparatus to distribute the image content by using the image content reproducing apparatus. Then, the image content is distributed to the image content reproducing apparatus and the viewer can utilize the image content. When the image content is reproduced, the image content reproducing apparatus detects the advertisement, inserting position and requests the advertisement image providing apparatus to distribute the advertisement image.

Thereafter, at the advertisement image providing apparatus, the advertisement image to be inserted to the image content is selected and transmitted to the image content reproducing apparatus. Further, the advertisement image is inserted to the position of the image content for inserting the advertisement and is reproduced by the image content reproducing apparatus.

In this way, the viewer utilizes the advertisement image in a state of not being separate from the image content as in banner advertisement but inserted to the image content. Therefore, the viewer is easy to turn one's eyes to the advertisement image and can utilize the advertisement image having a quality level the same as that of the image content. Further, the advertisement image to be inserted distributed from the advertisement image providing apparatus at respective time and therefore, when the advertisement image to be inserted is updated to a new one, only the advertisement image in the advertisement image apparatus may be updated.

According to a fifth aspect of the invention, the above-described object is achieved by an image content providing apparatus which is an image content providing apparatus for providing an image content, the image content providing apparatus comprising an image content database for storing the image content, list forming means having a function of forming a title list which is information of viewing the image content stored to the image content database and providing the title list, and image providing means having a function of inserting an advertisement image to the image content of the image database and distributing thereof.

Further, according to a sixth aspect of the invention, the above-described object is achieved by a program storage medium stored with an image content providing program which is a program storage medium stored with an image content providing program for providing an image content, the program storage medium comprising list forming means having a function of forming a title list constituting information of viewing the image content stored to the image content database and providing the title list, and image providing means having a function of inserting an advertisement image to the image content of the image content database and distributing thereof.

According to the constitution of the fifth or the sixth aspect of the invention, the list forming means forms the title list of the providable image content by request from the viewer and transmits thereof to the viewer. The viewer selects the image content which the viewer intends to utilize based on the title list and requests the image providing means to provide the image content. Then, the image providing means selects the requested image content from the image content database and provides thereof to the viewer. At this occasion, the image providing means detects the position of inserting the advertisement image into the image content and acquires the advertisement image to be inserted. Further, the image providing means inserts the advertisement image to the position of the image content for inserting the advertisement image and provides thereof to the viewer. Thereafter, when the advertisement image has been finished to provide, the image providing means restarts to provide the image content again.

In this way, the viewer utilizes the advertisement image in a state of not being separate from the image content but inserted to the image content. Therefore, the viewer is easy to turn one's eyes to the advertisement image and can utilize the advertisement image at a quality level the same as that of the image content.

According to a seventh aspect of the invention, the above-described object is achieved by an advertisement image providing apparatus which is an advertisement image providing apparatus having an advertisement image and providing the advertisement image, the advertisement image providing apparatus comprising an advertisement image database for storing the advertisement image, advertisement image selecting means for selecting the advertisement image to be provided from the advertisement image database, advertisement image providing means having a function of providing the advertisement image selected by the advertisement image selecting means and generating an advertisement providing log which is history information when the advertisement image is selected, and an advertisement, providing log database for storing the advertisement providing log.

Further, according to an eighth aspect of the invention, the above-described object is achieved by a program storage medium stored with an advertisement image providing program which is program storage medium stored with an advertisement image providing program for providing an advertisement image, the program storage medium comprising advertisement image selecting means selecting the advertisement image to provided from an advertisement image database, and advertisement image providing means having a function of providing the advertisement image selected by the advertisement image selecting means and generating an advertisement providing log constituting history information in providing the advertisement image.

According the constitution of the seventh or the eighth aspect of the invention, when the advertisement image selecting means is requested to distribute the advertisement image to be inserted to the image content, the advertisement image selecting means selects a specific one of the advertisement image from the advertisement image database and transmits thereof to the advertisement image providing means. Further, the advertisement image providing means provides the selected advertisement image. The advertisement image inserted to the image content is distributed from the advertisement image providing apparatus at respective time and accordingly, when the advertisement image to be inserted is updated to a new one, only the advertisement image in the advertisement image providing apparatus may be updated and the advertisement image can unitarily be controlled.

Further, according to a ninth aspect of the invention, the above-described object is achieved by an image content reproducing apparatus which is an image content reproducing apparatus for reproducing an image content, the content reproducing apparatus comprising image acquiring means for acquiring the image content and acquiring an advertisement image inserted to the image content, an image reproducing means having a function of reproducing the image content acquired by the image acquiring means and inserting the advertisement image to the image content based on an advertisement inserting condition data and reproducing thereof.

Further, according to a tenth aspect of the invention, the above-described object is achieved by a program storage medium stored with an image content reproducing program which is a program storage medium stored with an image content reproducing program for reproducing an image content, the program storage medium comprising image acquiring means for acquiring the image content and acquiring an advertisement image to be inserted to the image content, and image reproducing means having a function of reproducing the image content acquired by the image acquiring means and inserting the advertisement image to the image content based on advertisement inserting condition data and reproducing thereof.

According to the constitution of the ninth or the tenth aspect of the invention, the image acquiring means obtains the image content by way of, for example, a network or an information recording medium. Further, the image reproducing means reproduces the acquired image content. At this occasion, the image reproducing means detects the position of the image content for inserting the advertisement image. Further, when the position of inserting the advertisement image is detected, the image reproducing means requests the image acquiring means to acquire the advertisement image. The image acquiring means acquires the advertisement image by way of, for example, a network and transmits thereof to the image reproducing means. The image reproducing means inserts the acquired advertisement image to the position of the image content for inserting thereof and reproduces thereof. Further, when the advertisement image has been finished to reproduce, the image reproducing means restarts to reproduce the image content.

In this way, the viewer utilizes the advertisement image in a state of not being separate from the image content as in banner advertisement but inserted to the image content. Therefore, the viewer is easy to turn one's eyes to the advertisement image and can utilize the advertisement image at a quality level the same as that of the image content.

According to an eleventh aspect of the invention, the above-described object is achieved by an advertisement charge charging method comprising the steps of generating an advertisement, providing log data constituting a history of providing an advertisement image when the advertisement image is provided and storing the advertisement image to an advertisement providing log database and totalizing an advertisement charge charged to an owner of the advertisement image, an advertisement inserting charge distributed to an owner of the image content and an advertisement distributing charge distributed to the owner of the image content based on the advertisement providing log of the advertisement providing log database.

Further, according to a twelfth aspect of the invention, the above-described object is achieved by an advertisement charge totalizing system comprising advertisement image transmitting means for providing an advertisement image, generating an advertisement providing log constituting a history of providing thereof and storing thereof to an advertisement providing log database, and charge totalizing means for totalizing an advertisement charge charged to an owner of the advertisement image, an advertisement inserting charge distributed to an owner of an image content and an advertisement distributing charge distributed to the owner of the image content based on the advertisement providing log.

Further, according to a thirteenth aspect of the invention, the above-described object is achieved by a program storage medium stored with an advertisement charge totalizing program which is a program storage medium stored with an advertisement, charge totalizing program having a function of totalizing an advertisement charge, the program storage medium comprising advertisement image transmitting means for providing an advertisement image, generating an advertisement providing log constituting a history of providing thereof and storing thereof to an advertisement providing log database, and charge totalizing means for totalizing an advertisement charge charged to an owner of the advertisement image, an advertisement inserting charge distributed to an owner of the image content and an advertisement distributing charge distributed to the owner of the image content based on the advertisement providing log.

According to the constitution of the eleventh, the twelfth or the thirteenth aspect of the invention, when the advertisement image providing apparatus distributes the advertisement image, the advertisement providing log having information of distribution destination and distribution day/hour is stored to the advertisement providing log database. Further, the charge charging means respectively calculates the advertisement charge charged to the advertiser, the advertisement inserting charge distributed to the owner the image content and the advertisement distributing charge distributed to the image distributor for distributing the image content based on the advertisement providing log. Further, the advertisement charge is collected from the advertiser based on a result of calculation and distributed to the content owner and the viewer.

In this way, collection and distribution of the charge is unitarily controlled by the advertisement image providing apparatus. Further, the advertiser may pay the charge by an amount of the advertisement image and the advertisement image can be distributed efficiently. Further, since the advertisement inserting charge and the advertisement distributing charge are totalized based on the advertisement providing log, even when the image content owner and the image distributor do not provide the advertisement charge directly to the viewer, the advertisement inserting charge and the advertisement distributing charge are distributed firmly.

BRIEF DESCRIPTION OF THE DRAWINGS

FIG. 4A is a diagram showing an example of advertisement inserting condition data formed in the image content registering apparatus of FIG. 2;

FIG. 4B is a diagram showing an example of advertisement category information of advertisement inserting condition data formed n the image content registering apparatus of FIG. 2;

FIG. 4C is a diagram showing an example of an acceptability flag for advertisement inserting condition data formed in the image content registering apparatus of FIG. 2;

FIG. 5 is a diagram showing a data structure in an image content database in the image content providing apparatus of FIG. 2;

FIG. 6 is a block diagram showing a preferable embodiment of an advertisement image providing apparatus according to the invention;

FIG. 7A is a diagram showing an example of advertisement information formed in an advertisement image registering apparatus of FIG. 6;

FIG. 7B is a diagram showing an example of advertisement selecting condition formed in an advertisement image registering apparatus of FIG. 6;

FIG. 7C is a diagram showing an example of the condition kind and weighting of advertisement selecting conditions formed in an advertisement image registering apparatus of FIG. 6;

FIG. 8 is a diagram showing a data structure in an advertisement image database in the advertisement image providing apparatus of FIG. 6;

FIG. 9 is a diagram showing a data structure in an advertisement providing log database are the advertisement image providing apparatus of FIG. 6;

FIG. 10 is a flowchart showing an example of operation of the advertisement image providing apparatus of FIG. 6;

DETAILED DESCRIPTION OF THE PREFERRED EMBODIMENTS

A detailed explanation will be given of preferable embodiments of the invention in reference to the attached drawings as follows.

Further, the embodiments described below are preferable specific examples of the invention and therefore, technically preferable various limitations are attached thereto, however, the range of the invention is not limited to the embodiments unless where is a description of particularly limiting the invention in the following explanation.

Figure 1:
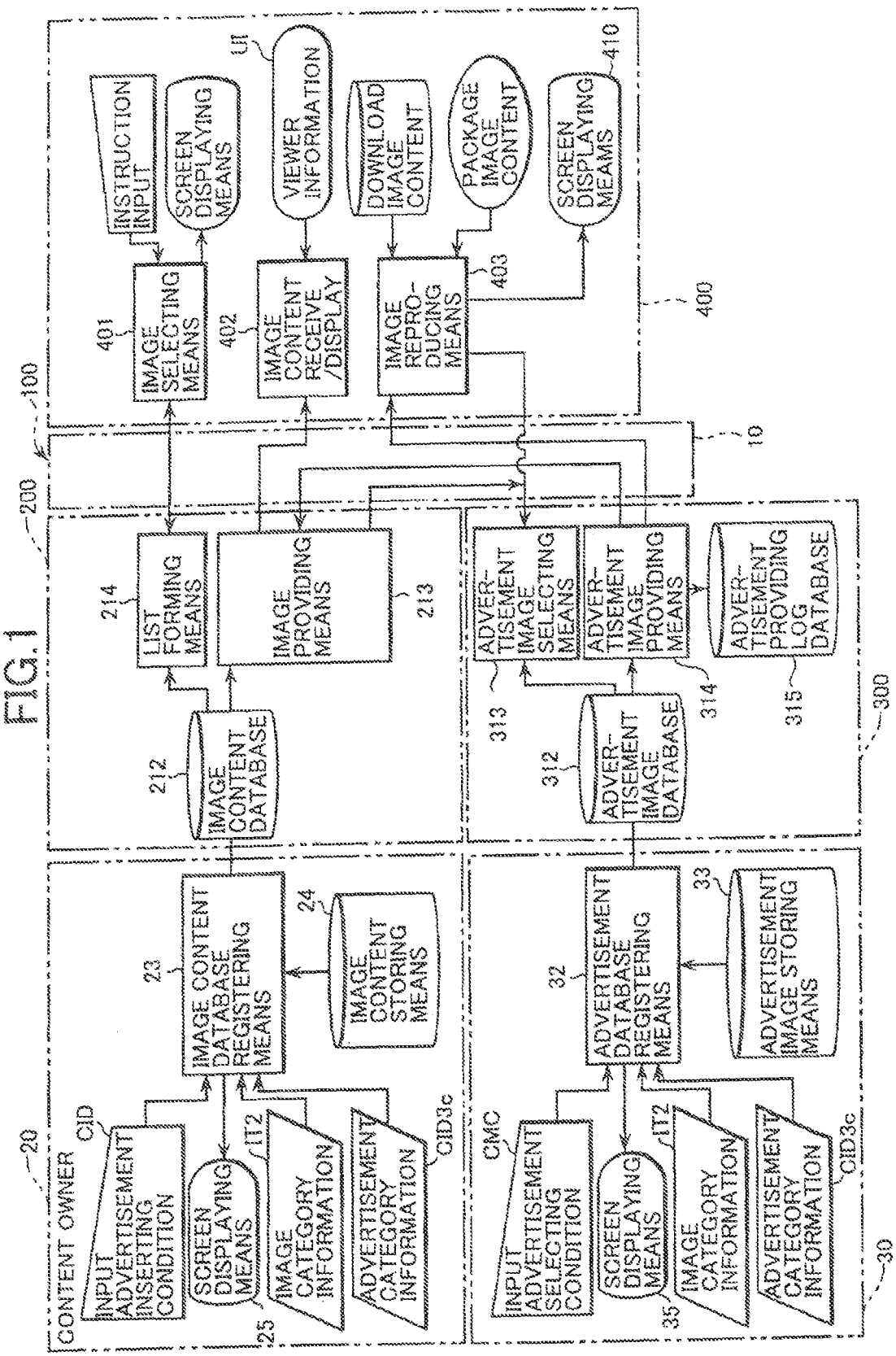
FIG. 1 is a block diagram showing a preferable embodiment of an image content providing system according to the invention.

FIG. 1 is constitution diagram showing a preferable embodiment of an image content providing system according to the invention and an explanation will be given of an image content providing system 100 in reference to FIG. 1.

The image content providing system 100 includes an image content providing apparatus 200, an advertisement image providing apparatus 300 and an image content reproducing apparatus 400. The image content providing apparatus 200, the advertisement image providing apparatus 300 and the image content reproducing apparatus 400 are capable of transmitting data to each other by a network 10 such as the Internet, a cable television (CATV) or LAN (Local Area Network).

The image content providing apparatus 200 is provided with an image content MC such as movie, drama or animation and is provided with a function of transmitting the image content MC to the image content reproducing apparatus 400.

The advertisement image providing apparatus 300 is provided with an advertisement image CM inserted to the distributed image content MC for distributing the advertisement image CM to the image content providing apparatus 200 or the image content reproducing apparatus 400.

The image content reproducing apparatus 400 reproduces the provided image content MC and the provided advertisement image CM for providing a viewer with the image content MC and the advertisement image CM.

A specific explanation will be given of the image content providing apparatus 200, the advertisement image providing apparatus 200 and the image content reproducing apparatus 400 as follows.

Figure 2:
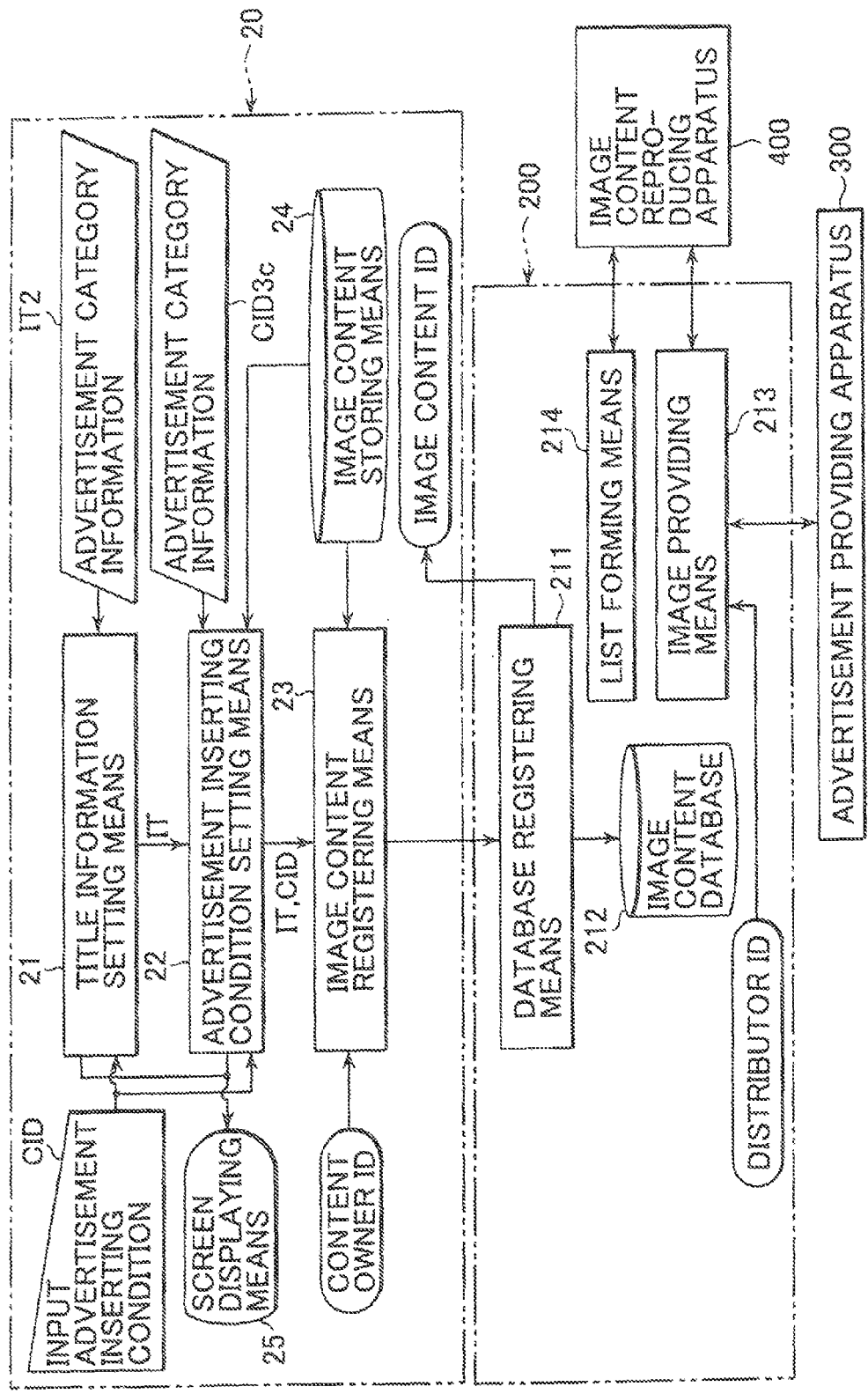
FIG. 2 is a block diagram showing a preferable embodiment of an image content providing apparatus according to the invention.

FIG. 2 is a constitution diagram showing examples of an image content registering apparatus 20 and the image content providing apparatus 200 and an explanation will be given of the image content registering apparatus 20 and the image content providing apparatus 200 in reference to FIG. 1 and FIG. 2.

The image content registering apparatus 20 is managed by, for example, a content owner having copyright of the image content MC. The image content registering apparatus 20 is provided with a function of registering the image content MC of the content owner to a side of the image content providing apparatus 200. Specifically, the image content registering apparatus 20 includes title information setting means 21, advertisement inserting condition setting means 22, image content registering means 23 and image content storing means 24.

The title information setting means 21 sets title information IT of the registered image content MC. For example, the title information IT is formed by, for example, the content owner by using inputting means such as a keyboard or a mouse. Further, the title information setting means 21 is provided with a function of outputting the formed title information IT to screen displaying means 25 and outputting thereof to a side of the advertisement inserting condition setting means 22.

Figures 3A, 3B:
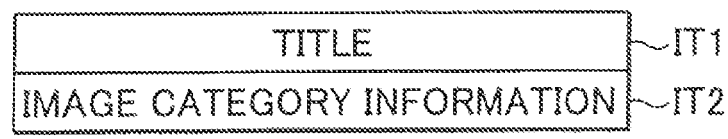
FIG. 3A is a diagram showing an example of title information IT formed an image content registering apparatus of FIG. 2.
FIG. 3B is a diagram showing an example of an information category of title information formed in an image content registering apparatus of FIG. 2.

In this case, as shown by FIG. 3A, the title information IT includes title IT1 and image category information IT2.

As shown by FIG. 3B, the image category information IT2 comprises identification numbers set for respective contents of the image content MC and the image category information IT2 is set by selecting the identification number.

The image category information IT2 is distributed beforehand by, for example, an advertisement distributor, mentioned later.

The advertisement inserting condition setting means 22 forms advertisement inserting condition data CID for setting a condition of the advertisement image CM inserted to the image content MC. In this case, the advertisement inserting condition data CID is formed by, for example, the image content owner by inputting specific information based on the screen displaying means 25.

Further, the advertisement inserting condition setting means 22 is provided with a function of outputting the formed advertisement inserting condition data ICD to the screen displaying means 25 and transmitting the title information IT and the advertisement inserting condition data ICD to the image content registering means 23.

As shown by FIG. 4A, the advertisement inserting condition data CID includes an inserting position condition CID1, a longest time insertion condition CID2 and an advertisement selecting condition CID3. The inserting position condition CID1 data designates a position capable of inserting the advertisement image CM in the image content MC. By setting the inserting position condition data CID1, the content owner can set a location which may be inserted with an advertisement image such as a timing of switching a scene in the image content. Therefore, when a user utilizes the image content MC, it is possible that quality of the image content MC is not impaired without reorganizing the image content MC.

The longest time insertion condition CID2 sets longest time of the advertisement image CM inserted to the image content MC. By setting the longest time insertion condition CID2, there an be imposed a restriction such that there is inserted only the advertisement image CM having a length which does not change flow of the image content MC and consciousness of a viewer.

The advertisement image selecting condition CID3 designates content of the advertisement image CM inserted to the image content MC and includes an inserting condition CID3a and an advertisement designating condition CID3b. Further, the inserting condition CID3a includes category information CID3c and an acceptability flag CID3d of the advertisement image CM.

The advertisement category information CID3c shows a category of the advertisement image CM capable of being inserted to the image content MC and comprises identification numbers which are different according to the respective categories as shown by, for example, FIG. 4B. The advertisement category information CID3c is distributed beforehand from, for example, an advertisement distributor, described later.

The acceptability flag CID3d sets a processing condition of advertisement category information CID3c. For example, as shown by FIG. 4C, when the acceptability flag CID3d is "0", only the advertisement image CM of a category designated by the advertisement category condition CID3c, can be inserted to the image content MC. Meanwhile, when the acceptability flag CID3d is "1", the advertisement image CM of a category designated by the advertisement category information CID3c cannot be inserted to the image content MC. In this way, the acceptability flag CID3d includes information of changing the processing condition of the advertisement category information CID3c.

The advertisement designating condition CID3b is a condition for inserting an advertisement image distributed from a specific advertiser and is constituted y advertiser/advertisement image ID and an acceptability flag CID3e. The advertiser/advertisement image ID comprises information designating a specific advertiser and the acceptability flag CID3e is a condition for setting a processing of the advertiser/advertisement image ID.

In this way, by setting the advertisement inserting condition CID3a and the advertisement designating condition CID3b, for example, the advertisement image CM of a category the same as or similar to the category of the image content MC can be selected as the advertisement image CM. Meanwhile, it is also possible to select the advertisement image CM of a category which is not intended to insert to the image content MC.

The image content registering means 23 in FIG. 2 is provided with a function of attaching content owner ID to the image content MC stored to the image content storing means 24 and the formed title information IT and the advertisement inserting condition CID and transmitting (registering) thereof to the side of the image content providing apparatus 200. In this case, the content owner ID is an identifier allocated to the respective content owner and the owner of the image content MC can be recognized by the content owner ID. Therefore, as described later, a destination of payment of a advertisement inserting charge can be identified by the content owner ID. Further, the content owner ID is distributed beforehand from, for example, an advertisement distributor, mentioned later.

An explanation will be given of an example of operation of the image content registering apparatus 20 in reference to FIG. 2.

First, the image content MC which the image content owner intends to register, is selected and the title information setting means 21 forms the title information IT in correspondence with the image content MC. Further, there is set a condition of the advertisement image CM inserted to the image content MC by the image content owner and the advertisement inserting condition setting means 22 forms the advertisement inserting condition data CID.

Thereafter, the formed title information IT and the formed advertisement inserting condition data CID are transmitted to the image content registering means 23. Further, the image content registering means 23 attaches the content owner ID to a set of the image content MC, the title information IT and the advertisement inserting condition data CID and transmits thereof to database registering means 211. Thereby, the image content MC owned by the image content owner is registered to the side of the content providing apparatus 200 and is brought into a distributable state. In this case, image content registering means 23 registers the content owner ID, the title information IT, the advertisement inserting condition data CID and the image content MC as mutually integrated (authored) data.

Next, explanation will be given of the image content providing apparatus 200 in reference to FIG. 2 as follows.

The image content providing apparatus 200 is managed by, for example, an image distributor and includes the database registering means 211, image content database 212, image providing means 213 and list forming means 214.

The database registering means 211 is provided with a function of attaching the image content ID respectively to the image content MC transmitted from the image content registering apparatus 20 and storing thereof to the image content database 212. Further, the database registering means 211 is provided with a function of transmitting the provided image content ID to the image content registering apparatus 20 and informing the image content ID to the owner of the image content MC.

In this case, as shown by FIG. 5, the image content database 212 is stored with the content owner ID, the title information IT, the advertisement inserting condition data CID and the image content MC in a state of being integrated to one set and attached with the image content ID.

The image providing means 213 is provided with a function of attaching distributor ID to the image content MC stored to the image content database 212 and providing thereof to the image content reproducing apparatus 400. The distributor ID is an identifier for identifying a distributor for distributing the image content. As described later, the distributor providing the image content MC is specified by the distributor ID and advertisement distributing charge distributed.

Further, as methods of providing the image content MC from the image providing means 213 to the image content reproducing apparatus 400, as described later, there are pointed out stream distribution, download distribution, package distribution, deputy stream distribution and multicast stream distribution. When there is carried out the download distribution or to package distribution, the image distributing means 213 distributes the image content MC and does not distribute the advertisement image CM.

Meanwhile, when the stream distribution, the deputy stream distribution or the multicast stream distribution are carried out, the image providing means is provided with a function of transmitting also the advertisement image CM transmitted from the advertisement image providing apparatus 300 to the image content reproducing apparatus 400 other than the image content MC. In this case, the distributed advertisement image CM is the advertisement image CM acquired from the advertisement image providing apparatus 300. Further, the image providing means 213 is provided with a function of inserting advertisement image CM transmitted from the advertisement image providing apparatus 300 into the image content MC based on the advertisement inserting condition CID and providing thereof.

The list forming means 214 is provided with a function of forming the title list TL comprising only the title information IT (title IT1) of the image content MC registered to the image content database 212 and transmitting thereof to the image content reproducing apparatus 400. A viewer selects the image content MC which the viewer intends to utilize based on the title list TL.

Next, an explanation will be given of an example of operation of the image content providing apparatus 200 in reference to FIG. 2.

The database registering means 211 attaches one of the image content ID to one set of the content owner ID, the image content MC, the advertisement inserting condition CID and the title information IT and storing thereof to the image content database 212. Further, the database registering means 211 transmits the provided image content ID to the side of the image content registering apparatus 20.

When the image content reproducing apparatus 400 requests the title list TL, the list forming means extracts only the title name IT1 present in the image content database 212 and forms the title list TL. Further, the list forming means 211 transmits the formed title list TL to the side of the image content reproducing apparatus 400.

Thereafter, when the image content reproducing apparatus 400 requests the image providing means 213 to distribute the image content MC, the image providing means 213 acquires the image content MC which is requested to distribute from the image content database 212. In this case, the image providing means 213 acquires the advertisement inserting condition CID from the image content database 212 along with the image content MC.

Further, when the image content MC is subjected to the so-to-speak download distribution or package distribution, the image providing means 213 provides the image content MC, the advertisement inserting condition CID and the distributor ID to the side of the image content reproducing apparatus 400.

Meanwhile, when the image content MC is subjected to the stream distribution, the image providing means 213 requests viewer information UI to the image content reproducing apparatus 400. Further, the image providing means 213 requests the advertisement image providing apparatus 300 to distribute the advertisement image CM and transmits the viewer information UI and the advertisement inserting condition CID thereto.

Further, the image providing means 213 inserts the advertisement image CM transmitted from the advertisement image providing apparatus 300 to the distributed image content based on the advertisement inserting condition CID and distributes thereof.

In this way, the image content providing apparatus 200 provides the image content MC or the image content MC and the advertisement image CM and provides the image content MC or the image content MC and the advertisement image CM to a viewer.

FIG. 6 is a block diagram showing an example of an advertisement image registering apparatus 30 and the advertisement image providing apparatus 300 and an explanation will be given of the advertisement image registering apparatus 30 and the advertisement image providing apparatus 300 in reference to FIG. 1 and FIG. 6.

The advertisement image registering apparatus 30 is managed by, for example, an advertiser and is provided with function of registering the advertisement image CM to the side of the advertisement image providing apparatus 300 for registering thereof. Specifically, the advertisement image registering apparatus 30 includes advertisement selecting condition setting means 31, advertisement image registering means 32 and advertisement image storing means 33.

The advertisement selecting condition setting means 31 forms the advertisement information CMI and the advertisement selecting condition CMC based on the image category information IT2 and the advertisement category information CID3c. In this case, for example, an advertiser forms the advertisement information CMI and the advertisement selecting condition CMC by setting thereof while observing the screen displaying means 35. Further, the advertisement image selecting condition setting means 31 is provided with a function of transmitting the formed advertisement information CMI and the advertisement selecting condition CMC to the advertisement image registering means 32. Further, the image category information IT2 and the advertisement category information CID3c are distributed beforehand from, for example, an advertisement distributor, described later.

In this case, as shown by FIG. 7A, the advertisement information CMI is constituted by, for example, advertisement title, advertisement category, advertisement imaging time, a maximum number of times of distribution and distribution time. Further, shown by FIG. 7B, the advertisement selecting condition CMC is constituted by, for example, condition kind CMC1, condition data CMC2 and weighting data CMC3.

The condition kind CMC1 and the condition data CMC2 indicate conditions when the advertisement image CM is inserted to the image content MC. Specifically, as shown by FIG. 7C, the condition kind CMC1 is set with condition kind such as gender or generation and the condition data CMC2 is set with content of the condition kind CMC1. Further, the image content MC or a viewer that is not adapted to the condition kind CMC1 and the condition data CMC2 is not distributed with the advertisement image CM. The weighting data CM3 indicates a priority of the individual condition kind CMC1 and the individual condition data CMC2 when the plurality of the advertisement selecting conditions CMC are set.

The advertisement image registering mean 32 is provided with a function of attaching an advertiser ID to the advertisement image CM, the advertisement information CMI and the advertisement selecting condition CMC stored to the advertisement image storing means 33 and registering thereof to the side of the advertisement image providing apparatus 300. In this case, the advertisement image registering means 32 registers, for example, the advertiser ID, the advertisement information CMI, the advertisement selecting condition CMC and the advertisement image CM as mutually integrated (authored) data.

Further, the advertiser ID is distributed beforehand from, for example, an advertisement distributor, described later and is constituted by an identifier inherent to an advertiser providing the advertisement image CM. Further, an owner of the distributed advertisement image CM is recognized by the advertiser ID and advertisement charge, described later, is collected.

Next, an explanation will be given of an example of operation of the advertisement image registering apparatus 30 in reference to FIG. 6.

First, an advertiser selects the advertisement image CM which the advertiser intends to register and forms the advertisement, information CMI and the advertisement selecting condition CMC by using inputting means such as a keyboard. Thereafter, the formed advertisement information CMI and the formed advertisement selecting condition CMC are transmitted to the advertisement image registering means 32. Further, the advertisement image registering means 32 attaches the content owner ID to the advertisement image CM, the advertisement information CMI and the advertisement selecting condition CMC and transmits thereof to advertisement database registering means 311. Thereby, the advertisement image CM owned by the advertiser is registered to the side of the advertisement image providing apparatus 300 to thereby bring about a distributable state.

Next, an explanation will be given of the advertisement image providing apparatus 300 in reference to FIG. 6.

The advertisement image providing apparatus 300 is provided with a function of distributing the advertisement image CM to the image content providing apparatus 200 or the image content reproducing apparatus 400 and includes the database registering means 311, advertisement image database 312, advertisement image selecting means 313, advertisement image providing means 314 and advertisement providing log database 315.

The advertisement database registering means 311 is provided with a function of attaching one of the advertisement image ID to the advertisement image CM, the advertisement information CMI and the advertisement image setting condition CMC transmitted from the advertisement image registering means 32 and storing thereof to the advertisement database 312. Further, the advertisement database registering means 311 is provided with a function of transmitting the provided advertisement image ID to the advertisement image registering apparatus 30 and informing thereof to the advertiser.

Therefore, as shown by FIG. 8, the advertisement image database 312 is integrated and stored with the advertiser ID, the advertisement information CMI, the advertisement image CM and the advertisement selecting condition CMC attached with one of the advertisement image ID.

The advertisement image selecting means 313 is provided with a function of selecting the advertisement image MC to be inserted based on the advertisement inserting condition data CID and the viewer information UI transmitted from the image content providing apparatus 200 or the image content reproducing apparatus 400.

Specifically, the advertisement image selecting means 313 compares the transmitted advertisement inserting condition data CID and the transmitted viewer information UI with the advertisement information CMI and the advertisement selecting condition CMC and selects the advertisement image CM adapted to the advertisement inserting conditions CID. Thereafter, the advertisement image selecting means 313 transmits, for example, corresponding one of the advertisement image CM to the advertisement image providing means 314.

The advertisement image providing means 314 is provided with the function of extracting the advertisement image CM selected by the advertisement image selecting means 313 from the advertisement image database 312 and transmitting thereof to the image content providing apparatus 200 or the image content reproducing apparatus 400. Further, the advertisement image providing means 314 is provided with a function of generating advertisement providing log CL which is distribution record of the advertisement image CM and storing thereof to the advertisement providing log base 315.

In this case, as shown by FIG. 9, the advertisement providing log SL is constituted by, for example, distribution day/hour, a distributor ID, a content owner ID, title IT1, image category information CID3c and viewer information UI. Advertisement charge, described later, is collected by using the advertisement providing log SL.

FIG. 10 is a flowchart showing an example of operation of the advertisement image providing apparatus 300 and an explanation will be given of the example of the operation of the advertisement image providing apparatus 300 in reference to FIG. 6 and FIG. 10.

First, the advertisement image CM is requested to distribute from the image content providing apparatus 200 or the image content reproducing apparatus 400 to the advertisement image selecting means 313 in FIG. 6 (ST1). At this occasion, the advertisement image selecting means 313 is transmitted with the advertisement inserting condition CID and the viewer information UI. Then, the advertisement image selecting means 313 determines whether the advertisement inserting condition data CID is transmitted along with the distribution request (ST2).

When the advertisement inserting condition data CID is transmitted, the advertisement image selecting means 313 compares the advertisement inserting condition data CID and the viewer information UI with the advertisement information CMI and the advertisement selecting condition CMC and extracts the advertisement image CM, the advertisement image database 312 (ST3). Meanwhile, when there is not present the advertisement inserting condition data CID, the advertisement image selecting means 313 determines which advertisement image CM is to be inserted.

Thereafter, the advertisement image selecting means 313 determines an order of the advertisement image CM to be provided in the extracted advertisement image CM or the advertisement image CM of the advertisement image registering database 312. At this occasion, the advertisement image selecting means 313 determines a size thereof by subjecting the advertisement image CM to point conversion by, for example, the weighting data CMC3, a number of times of distribution of the advertisement information CMI or the advertiser ID (ST4). Further, the advertisement image selecting means 314 selects successively from the advertisement image CM having a larger point and transmits thereof to the advertisement image providing means 314.

The advertisement image providing means 314 transmits the selected advertisement image CM to the image content providing apparatus 200 or the image content reproducing apparatus 400 (ST6). Further, the advertisement image providing means 314 forms the advertisement providing log SL at that time and preserves thereof to the advertisement providing database 315 (ST7). In this way, the image advertisement CM is distributed from the advertisement image providing apparatus 300 and the advertisement providing to CL is formed.

Next, an explanation will be given of the image content reproducing apparatus 400 in reference to FIG. 1.

The image content reproducing apparatus 400 of FIG. 1 includes image content selecting means 401, image acquiring means 402 and image reproducing means 403. The image content selecting means 401 requests distribution of the title list TL to the image content providing apparatus 200 by an instruction input from a viewer and acquires thereof. Further, the image content selecting means 401 is provided with a function of displaying the title list TL at screen displaying means 410 of CRT or liquid crystal display apparatus and the viewer selects the image content MC to be reproduced from the title list TL.

The image acquiring means 402 is provided with a function of acquiring the image content MC and the advertisement image CM and transmitting thereof to the image reproducing means 403. Specifically, when the image content MC is provided by the stream distribution, the deputy stream distribution or the multicast stream distribution, the image acquiring means 402 requests the image content providing apparatus 200 to distribute the image content MC and transmits the viewer information UI thereto. Then, the image acquiring means 402 acquires the image content MC and the advertisement image CM exerted thereto from the image content providing apparatus 200. In this case, the viewer information UI is constituted by, for example, gender, generation, occupation and area of the viewer.

Meanwhile, when the image content MC is provided by the download distribution or the package distribution, the image acquiring means 402 is provided with a function of simultaneously acquiring the advertisement inserting condition data CID when acquiring the image content MC from the image content providing apparatus 200 and transmitting thereof to the image reproducing means 403.

The image reproducing means 403 is provided with a function of reproducing the image content MC and the advertisement image CM and outputting thereof to the image displaying means 410. Further, the image reproducing means 403 is provided with a function of detecting an advertisement inserting position of the image content MC based on the advertisement inserting condition CID, requesting the advertisement image providing apparatus 300 to distribute the advertisement image CM and transmitting the viewer information UI and the advertisement inserting condition data CID.

Next, an explanation will be given of an example of operation of the image content reproducing apparatus 400 in reference to FIG. 1.

First, a viewer requests the title list TL by inputting means to obtain the image content MC. Then, the image content selecting means 401 requests the image content providing apparatus 300 to distribute the title list TL.

Thereafter, when the title list TL is transmitted from the image content providing apparatus 200, the image content selecting means 401 makes the screen displaying means 410 display the requested title list TL. The viewer selects the image content MC which the viewer intends to obtain based on the title list of the screen displaying means 410, inputs thereof by inputting means and requests to obtain thereof.

When the image content MC is subjected to the stream distribution, the image content providing apparatus 200 inquires the viewer information UI and the image acquiring means 402 transmits the viewer information UI to the image content providing apparatus 200. Then, the image content MC which is brought into a state of being inserted with the advertisement image CM, is transmitted to the image acquiring means 402. Further, the image acquiring means 402 transmits the transmitted image content MC and the transmitted advertisement image CM to the image reproducing means 403. Further, the image reproducing means 403 makes the screen displaying means 410 display the image content MC and the advertisement image CM.

Meanwhile, when the image content MC is subjected to the download distribution or the package distribution, the image content MC, the distributor ID and the advertisement inserting condition CID are transmitted to the image acquiring means 402 via the network 10 or as an information recording medium.

Further, the image reproducing means 403 reproduces the provided image content MC and detects the advertisement image inserting position based on the advertisement inserting condition CID.

Thereafter, when the image reproducing means 403 detects the advertisement inserting position, distribution of the advertisement image CM is requested to the advertisement image providing apparatus 300. Further, the image acquiring means 402 inserts the advertisement image CM from the advertisement image providing apparatus 300 to the image content MC and outputs thereof to the image displaying means 410. In this way, the image content reproducing apparatus 400 can acquire the image content MC and the advertisement image CM, insert the advertisement image CM to the image content MC and provide thereof to the viewer.

First Embodiment

Case of Stream Distribution

Figure 11:
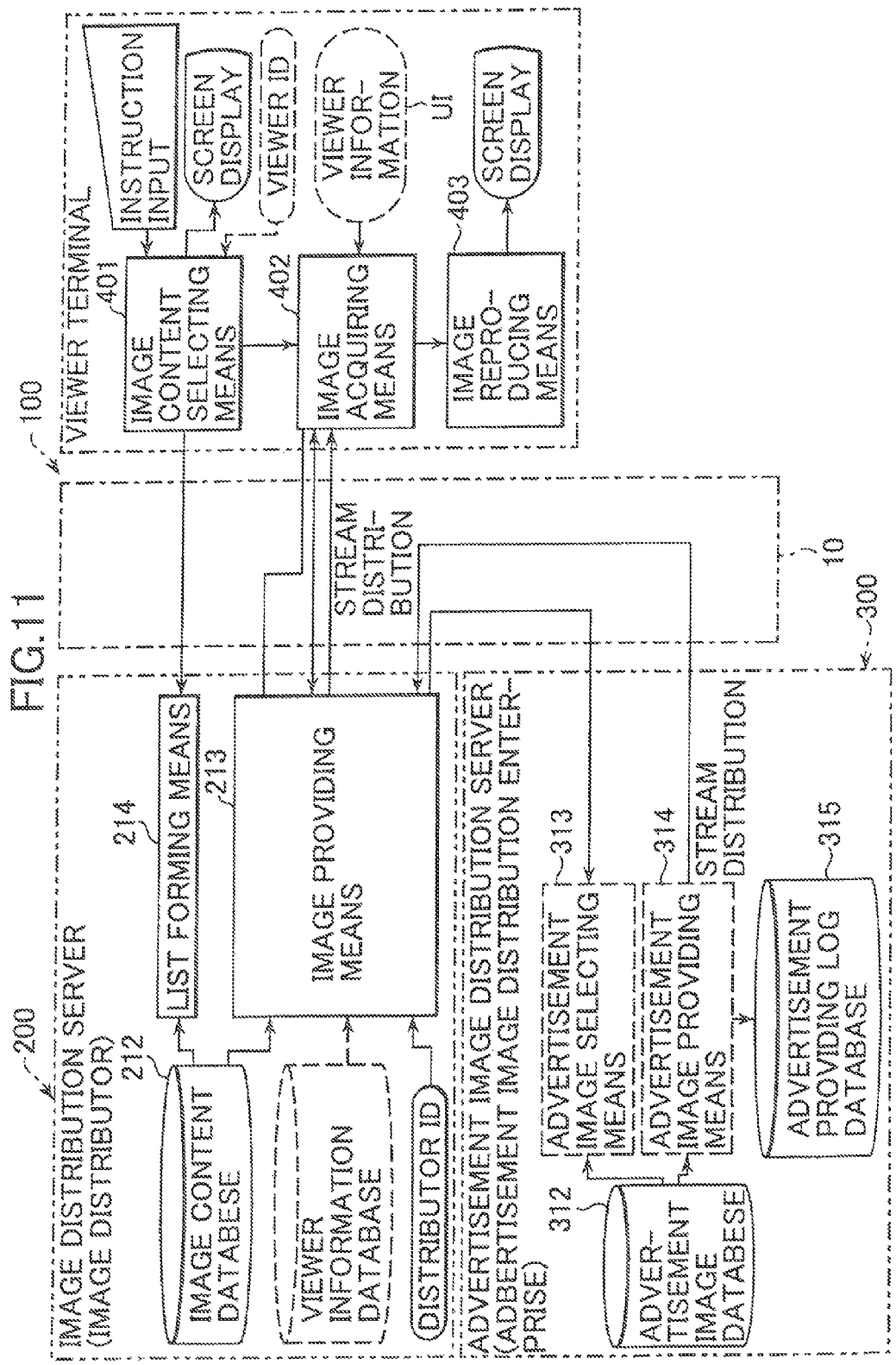
FIG. 11 is a block diagram showing a first embodiment of an image content providing system according to the invention.
Figure 12:
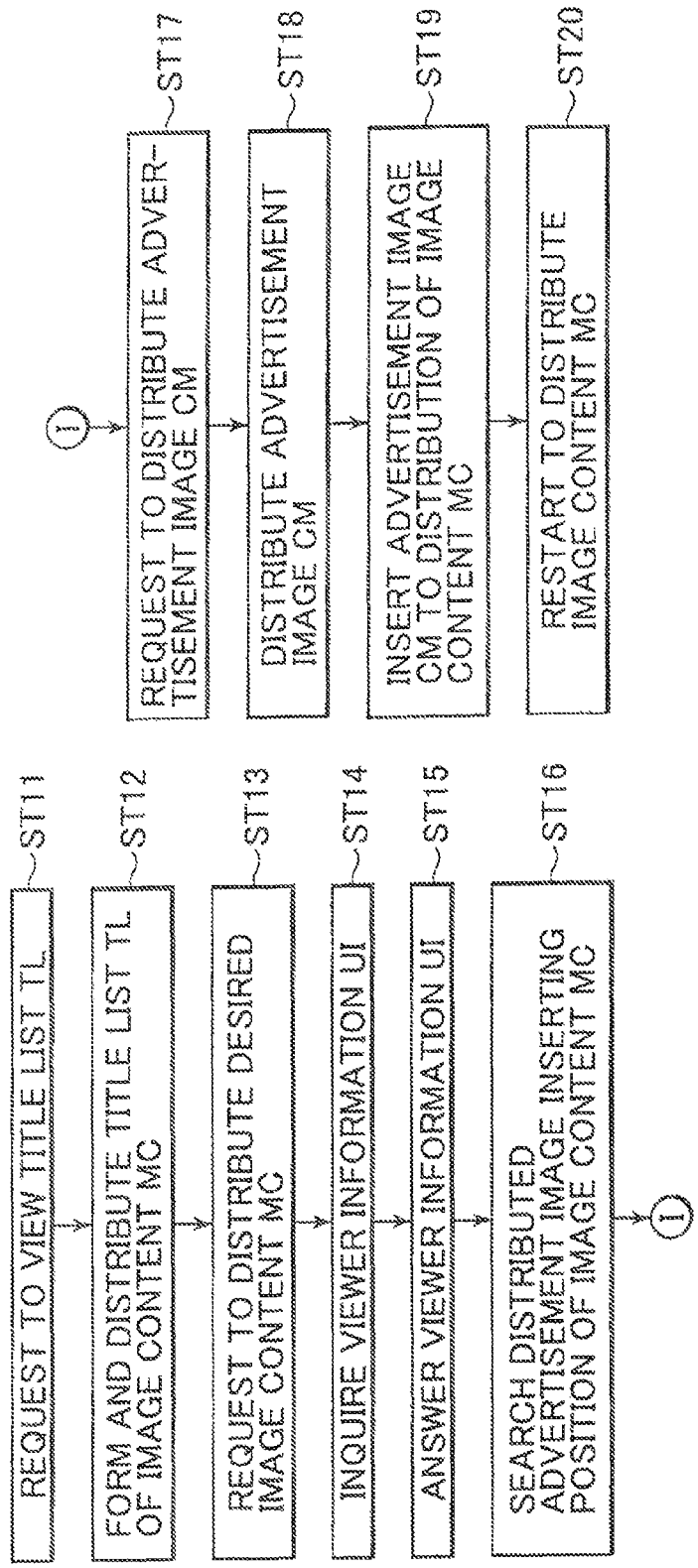
FIG. 12 is a flowchart showing the first embodiment of the image content providing method according to the invention.

FIG. 11 is a block diagram showing first embodiment of an image content providing system according to the invention, FIG. 12 shows a flowchart showing an example of an image content providing method according to the invention, respectively, an explanation will be given of an image content providing method in reference to FIG. 11 and FIG. 12. Further, the image content providing system and the image content providing method shown in FIG. 11 and FIG. 12 refer to a case in which the image content MC is distributed by so-to-speak stream distribution.

First, by an instruction input of a viewer, the title list TL is requested from the image content reproducing apparatus 400 to the image content providing apparatus 200 (ST11). Then, by the list forming means 214 of the image content providing apparatus 200, the title IT1 is extracted from the image database 212 and the title list TL is formed. Further, the formed title list TL is transmitted from the title list forming means 214 to the image content reproducing apparatus 400 (ST12).

Next, based on the title list transmitted from the image content reproducing apparatus 400, there is selected the image content MC which the user intends to utilize. Thereafter, the desired image content MC is requested to distribute from the image acquiring means 402 to the image content providing apparatus 200 (ST13).

Then the viewer information UI is inquired from the image content providing apparatus 200 to the image content reproducing apparatus 400 (ST14) and the viewer information UI is transmitted from the image content reproducing apparatus 400 to the image content providing apparatus 200 (ST15). In this case, when the image content MC is distributed under, for example, a membership system, the viewer information UI is not inquired, the viewer ID is inquired, the viewer ID is checked with viewer information database 215 and the viewer information UI is extracted.

Further, in the image content providing apparatus 200, the image content MC requested to distribute and the advertisement inserting condition data CID related thereto, are acquired from time image content database 212 by the image providing means 213. Further, the image content MC is distributed to the image content reproducing apparatus 400 by the image providing means 213. Then, in the image content reproducing apparatus 400, transmitted data of the image content MC is successively reproduced by the image reproducing means 403.

In the image content providing apparatus 200, when the image content MC, is distributed, based on the advertisement inserting condition data CID, the advertisement image inserting position is scanned by the image providing means 213 (ST16). Further, when the advertisement inserting position is detected, the advertisement image providing apparatus 300 is requested to distribute the advertisement image CM (ST17). At this occasion, the advertisement image providing apparatus 300 is transmitted with the advertisement inserting condition data CID and the viewer information along with the request of distributing the advertisement image CM.

Then, in the advertisement image providing apparatus 300, the advertisement image CM to be inserted is selected by the advertisement image selecting means 313 based on the transmitted advertisement inserting condition data CID and the transmitted viewer information UI. Further, the selected advertisement image CM is subjected to, for example, stream distribution to the side of the image content providing apparatus 200 by the advertisement image providing means 314 (ST18).

The distributed advertisement image CM is inserted to the advertisement inserting position in the image content MC and is subjected to stream distribution to the image content reproducing apparatus 400 (ST19). Further, when the stream distribution of the advertisement image CM has been finished, the image content providing apparatus 200 restarts to distribute the image content MC (ST20).

In this way, even when the image content MC is not formed with a single file previously inserted with the advertisement image CM, the advertisement image CM can be inserted specific position of the image content MC. Therefore the user views the advertisement image CM in the midst of utilizing the image content MC and therefore, promotion of advertisement effect can be achieved. Further, the advertisement CM transmitted from the advertisement image providing apparatus 300 can dynamically be changed and therefore, the advertisement image CM can be prevented from being obsolete. Therefore, the always new advertisement image CM can be proved to the viewer and promotion of advertisement effect can be achieved.

Further, the category of the advertisement image CM can be set to adapt to the category of the image content MC and therefore, the advertisement image CM of the category related to the distributed image content MC can be distributed. Therefore, there can be achieved an advertisement effect higher than that in the case of making the advertisement image CM flow at random.

Further, the advertisement image CM is selected in reference to the viewer information set at the image content reproducing apparatus 400 and therefore, the viewer can select adoption or rejection of the advertisement image CM and select the category. Therefore, there can be distributed the advertisement image CM which differs by the respective viewer and there can be distributed the advertisement image CM adapted to the respective viewer and having high advertisement effect.

Second Embodiment

Case of Download Distribution

Figure 13:
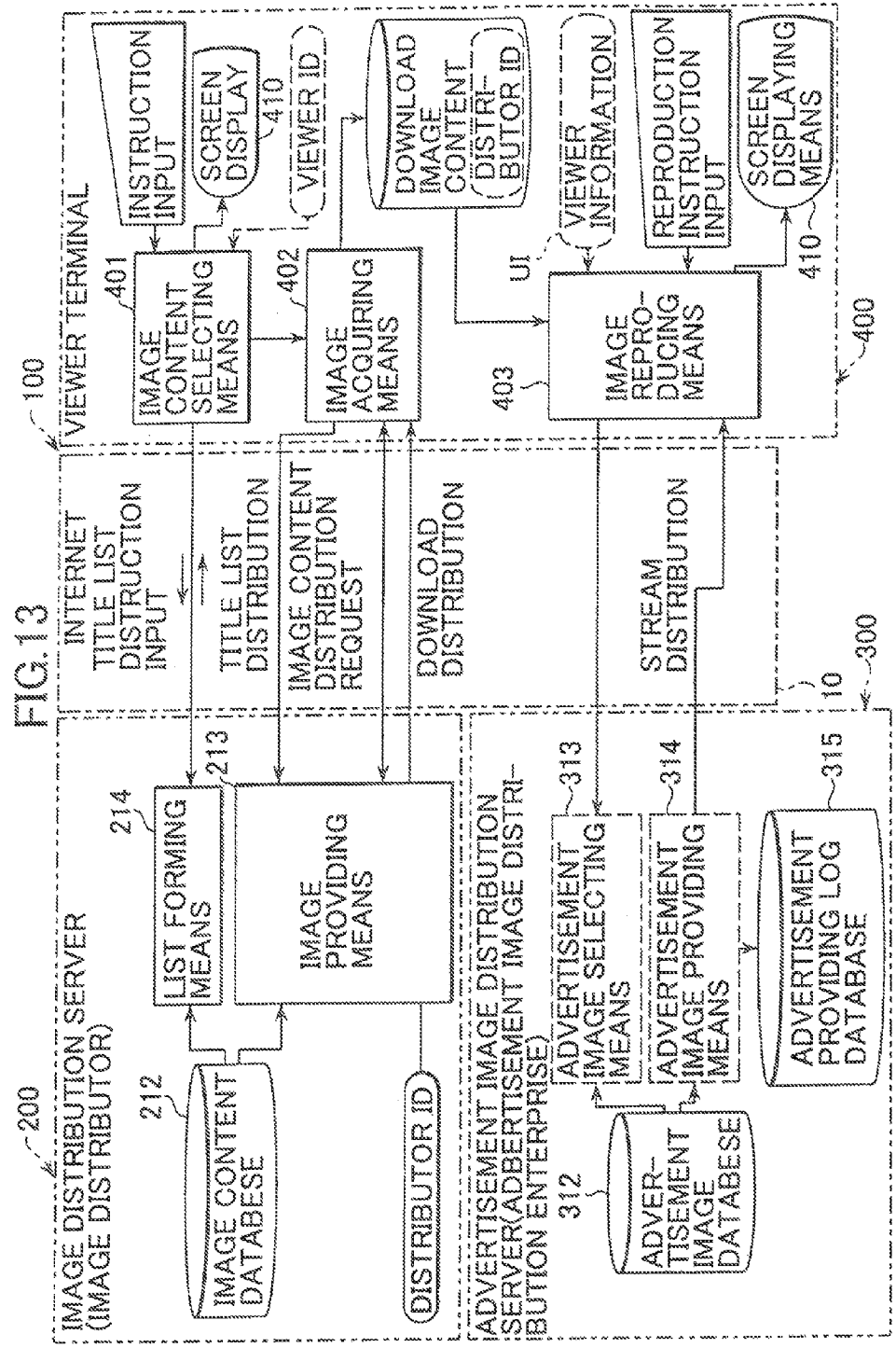
FIG. 13 is a block diagram showing a second embodiment of an image content providing system according to the invention.
Figure 14:
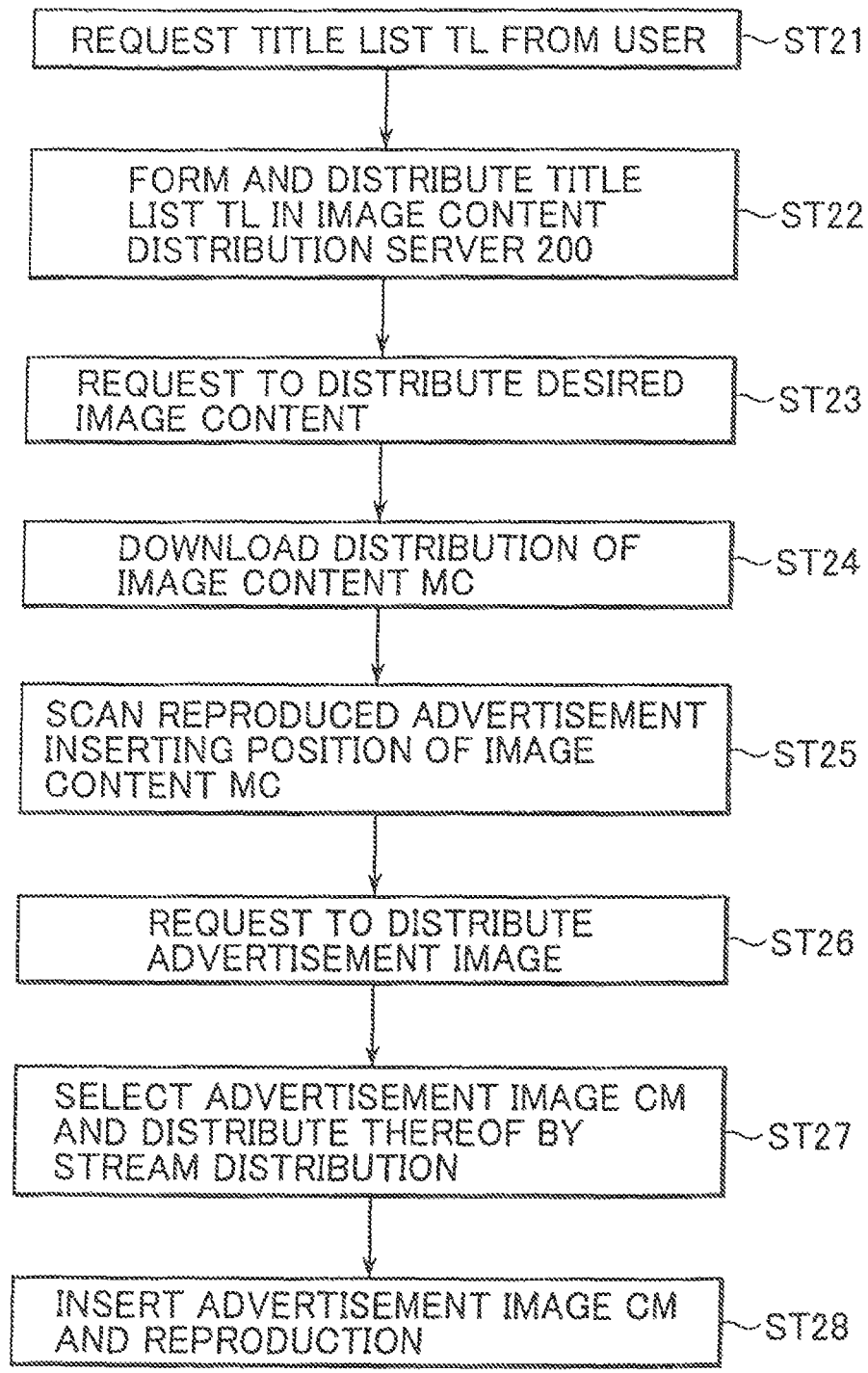
FIG. 14 is a flowchart showing the second embodiment of the image content providing method according to the invention.

FIG. 13 is a block diagram showing a second embodiment of an image content providing system according to the invention, FIG. 14 is a flowchart showing a second embodiment of an image content providing method according to the invention, respectively, and an explanation will be given of an image content providing method in reference to FIG. 13 and FIG. 14. Further, FIG. 13 and FIG. 14 refer to a case of so-to-speak download distribution in which the image content MC is downloaded to image content reproducing apparatus 400.

First, by an instruction input of a viewer of FIG. 13, the title list is requested from the image content reproducing apparatus 400 to the image content providing apparatus 200 (ST21). Then, the title list forming means 214 in the image content providing apparatus 200 extracts title IT1 from the image database 212 and forms the title list. Further, the formed title list is transmitted from the title list forming means 214 to the image content reproducing apparatus 400 (ST22).

Next, based on the title list transmitted to the image content reproducing apparatus 400, there is selected the image content MC which the use intends to utilize. Thereafter, the desired image content MC is requested to distribute from the image acquiring means 402 to the image providing apparatus 200.

Further, in the image content providing apparatus 200, the image content MC which is requested to distribute and the advertisement inserting condition data CID are acquired from the image content database 212 by the image providing means 211. Further, the image providing means 213 distributes the image content MC, the advertisement inserting condition CID and the distributor ID to the image content reproducing apparatus 400 (ST24).

Thereafter, the viewer starts the image reproducing means 403 and reproduces the downloaded image content MC. At this occasion, the advertisement inserting position is scanned by the image reproducing means 403 based on the advertisement inserting condition data CID (ST25). When the advertisement inserting position is detected, distribution of the advertisement image CM is requested from the image acquiring means 402 to the advertisement image providing apparatus 300 (ST26). At this occasion, the distributor ID, the advertisement inserting condition data CID and the viewer information UI are provided from the image content reproducing apparatus 400 to the advertisement image providing apparatus 300.

Then, in the advertisement image providing apparatus 300, the advertisement image CM to be distributed is selected by the advertisement image selecting means 313 based on the distributor ID, the advertisement inserting condition data CID and the viewer information UI. Further, the selected advertisement image CM is subjected to stream distribution from the advertisement image providing means 314 to the image content reproducing apparatus 400 (ST27).

The distributed advertisement image CM is reproduced by the image reproducing means 402 and is displayed at the screen displaying means 410 (ST28). Further, when reproduction of the advertisement image CM has been finished, reproduction of the image content MC is restarted.

In this way, even when only the image content MC is downloaded, the advertisement image CM can be acquired separately by using the advertisement inserting condition data and can be inserted to the image content MC. Therefore, the advertisement image CM can be provided in the midst of utilizing the image content MC by the viewer.

Third Embodiment

Case of Package Distribution

Figure 15:
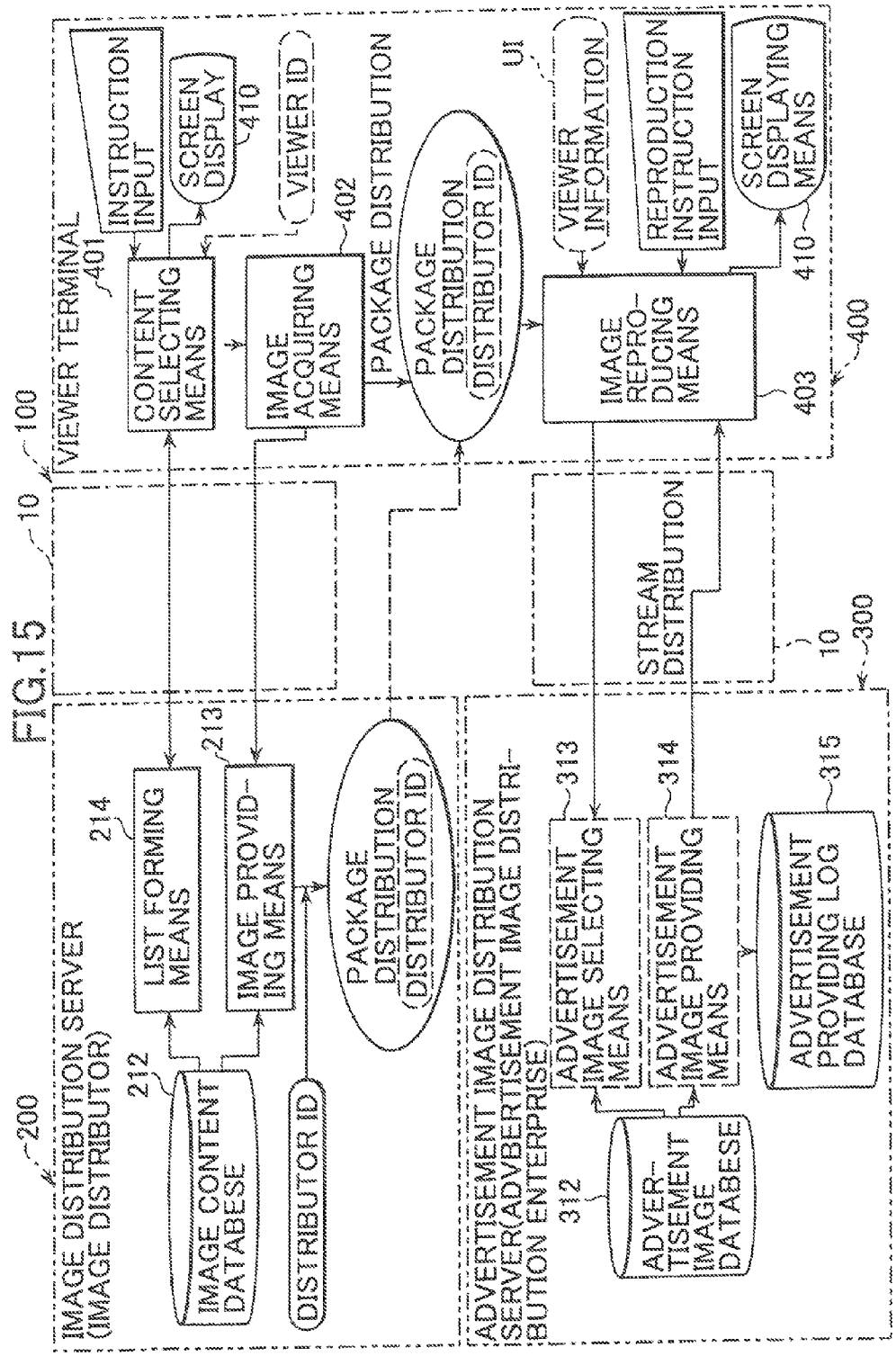
FIG. 15 is a block diagram showing a third embodiment of an image content providing system according to the invention.
Figure 16:
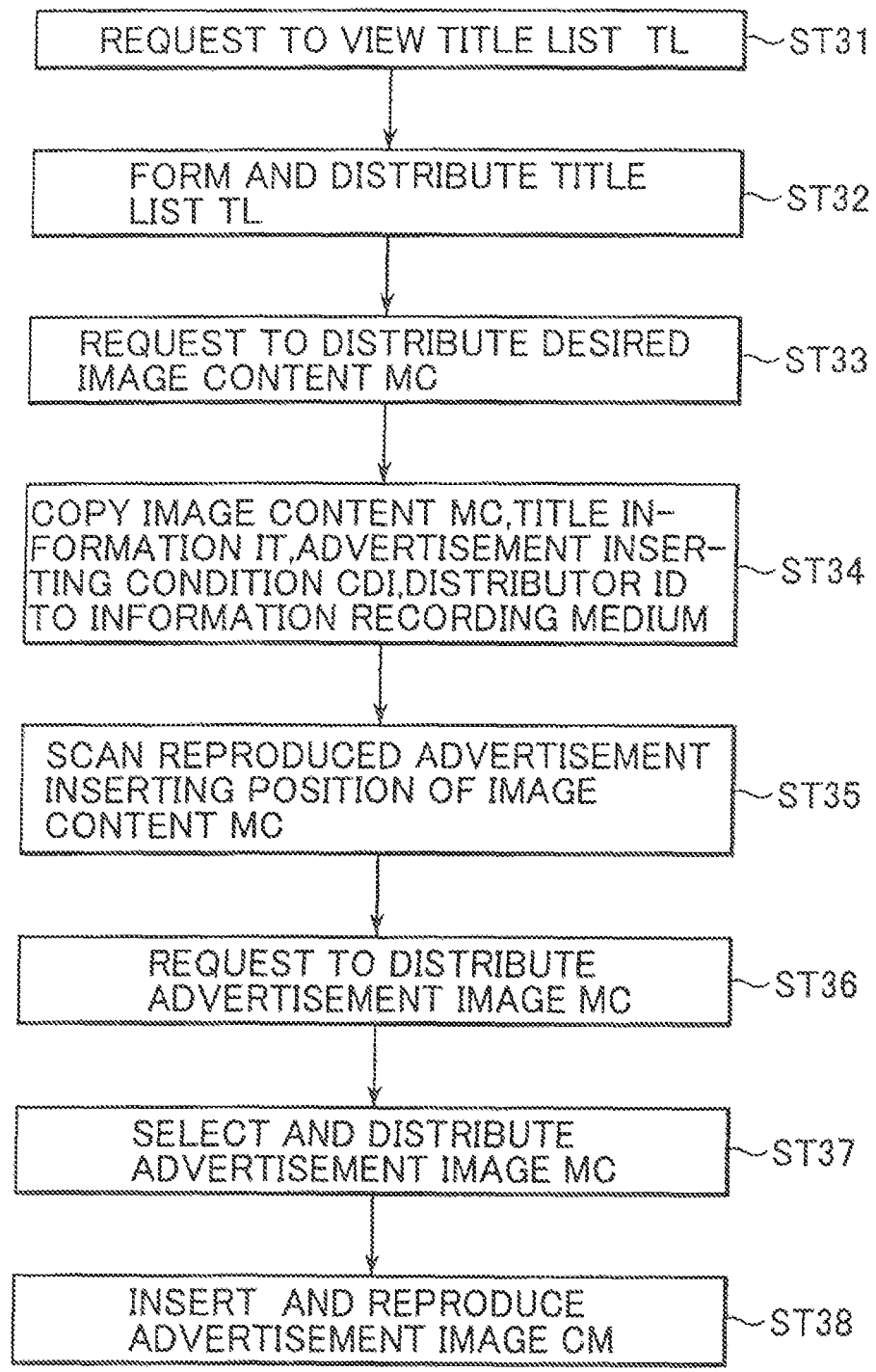
FIG. 16 is a flowchart showing the third embodiment of the image content providing method according to the invention.

FIG. 15 is a block diagram showing third embodiment of an image content providing system according to the invention, FIG. 16 shows a flowchart showing third embodiment of an image content providing method according to the invention, respectively, and an explanation will be given of an image content providing method in reference to FIG. 15 and FIG. 16. Further, FIG. 15 and FIG. 16 refer to a case of so-to-speak package distribution in which the image content MC is distributed as an information record medium such as an optical disk, a magneto-optical disk or a magnetic disk.

First, by an instruction input of a viewer of FIG. 15, the title list TL is requested from the image content reproducing apparatus 400 to the image content providing apparatus 200 (ST31). Then, by the title list forming means 214 in the image content providing apparatus 200, title IT1 is extracted from the image database 212 and the title list TL is formed. Further, the title list TL is transmitted from the title list forming means 214 to the image content reproducing apparatus 400 (ST32).

Next, based on the title list TL transmitted from the image content reproducing apparatus 400, there is selected the image content MC which the user intends to utilize. Thereafter, the desired image content MC is requested to distribute from the image acquiring means 402 to the image content providing apparatus 200 (ST33).

Then, in the image content providing apparatus 200, the selected image content MC and the title information IT, the advertisement inserting condition data CID and the distributor ID are copied to an information record medium such as an optical disk (ST34). Further, the information record medium is distributed from the image content providing apparatus 200 to the viewer.

The distributed information record medium is reproduced by the image reproducing means 403. At this occasion, the advertisement inserting position is scanned by the image reproducing means 403 based on the advertisement inserting condition data CID (ST35). Further, when the advertisement inserting position is detected, the advertisement image CM is requested to distribute and the advertisement inserting condition data CID and the viewer information UI are transmitted from the image acquiring means 402 to the advertisement providing apparatus 300 (ST36).

Then, in the advertisement image providing apparatus 300, based on the distributor ID, the advertisement inserting condition data CID and the viewer information UI, the advertisement image CM to be distributed is selected by the advertisement image selecting means 313. Further, the selected advertisement image CM is distributed from the advertisement image providing means 314 to the image content reproducing apparatus 400 (ST37).

The distributed advertisement image CM is reproduced by the image reproducing means 402 and is displayed at the screen displaying means 410. Further, when reproduction of the advertisement image CM has haven finished, reproduction of the image content MC is restarted (ST38).

In this way, even in the case of so-to-speak package distribution in which the image content MC is recorded to the information record medium and distributed, the advertisement image CM can be inserted to the image content MC formed as a single file.

Forth Embodiment

Case of Deputy Stream Distribution

Figure 17:
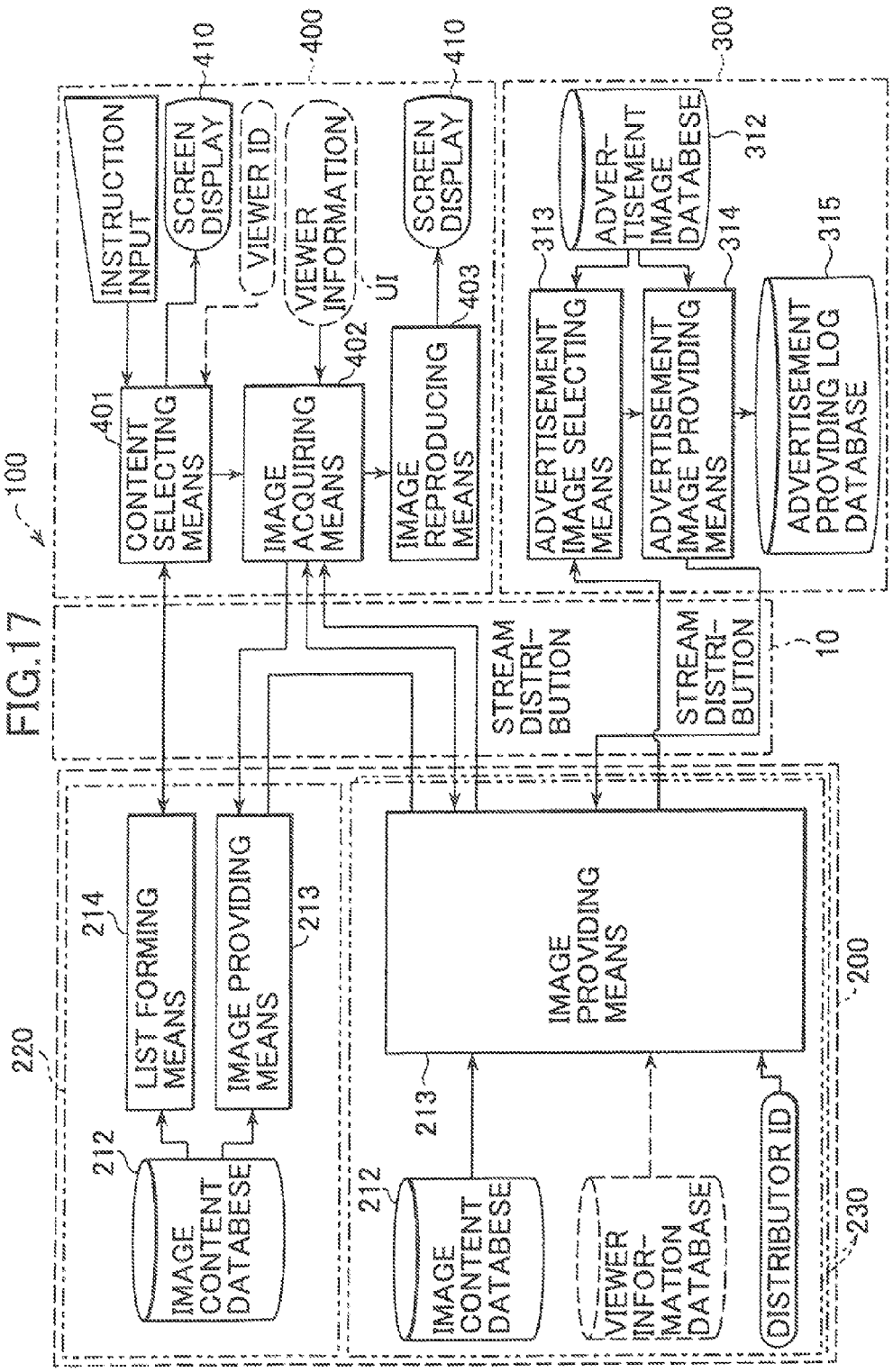
FIG. 17 is a block diagram showing a fourth embodiment of an image content providing system according to the invention.
Figure 18:
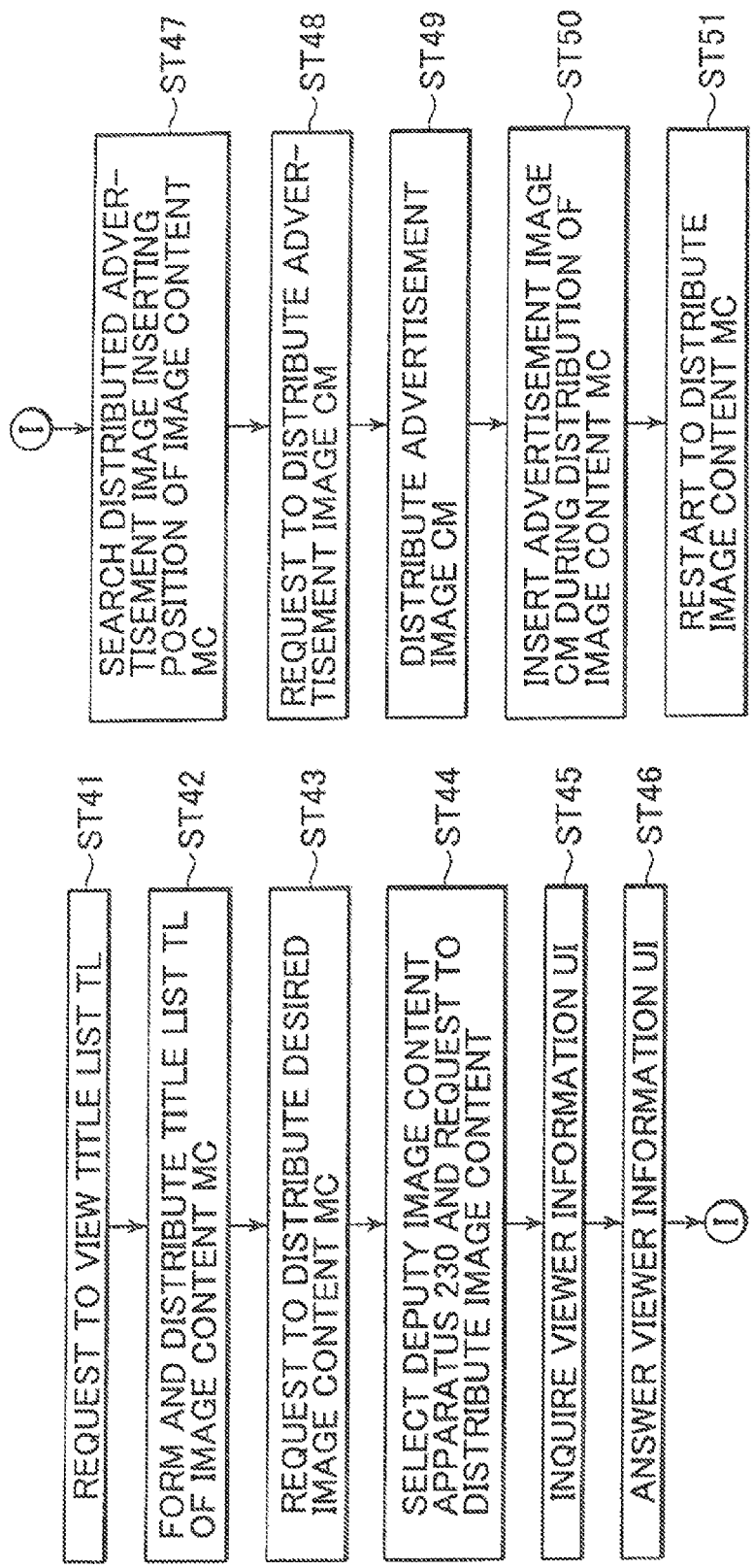
FIG. 18 is a flowchart showing the fourth embodiment of the image content providing method according to the invention.

FIG. 17 is block diagram showing forth embodiment of an image content providing system according to the invention, FIG. 18 is a flowchart showing fourth embodiment of an image content providing method according to the invention, respectively, and an explanation will be given of an image content providing method in reference to FIG. 17 and FIG. 18. Further, FIG. 17 and FIG. 18 refer to a case of so-to-speak deputy stream distribution in which the image content MC is distributed by a plurality of deputy image content distributing apparatus 230.

Further, in the image content providing system 100 of FIG. 17, the image content providing apparatus 200 is provided with a main image content distributing apparatus 220 and the plurality of deputy image content distributing apparatus 230. Further, the main image content distributing apparatus 220 and the deputy image content distributing apparatus 230 are provided with constitutions the same as each other. The main image content distributing apparatus 220 receives a distribution request mainly from the image content reproducing apparatus 400 and the deputy image content distributing apparatus 203 distributes the image content MC mainly to the image content reproducing apparatus 400.

First, by an instruction input of a viewer of FIG. 17, the title list TL is requested from the image content reproducing apparatus 400 to the image content providing apparatus 200 (ST41). Then, the title list TL which has extracted title IT1 is formed by the title list forming means 214 in the main image content distributing apparatus 200. Further, the formed title list TL is transmitted from the title list forming means 214 to the image content reproducing apparatus 400 (ST42).

Next, based on the title list TL transmitted to the image content reproducing apparatus 400, there is selected the image content MC which a user intends to utilize. Thereafter, the desired image content MC is requested to distribute from the image acquiring means 402 to the image content providing apparatus 200 (ST43).

Then, the main image content distributing apparatus 200 allocates the deputy image content distributing apparatus 230 which is, for example, most proximate to the image content reproducing apparatus 400 among the plurality of deputy content distributing apparatus 230. Further, the main image content distributing apparatus 220 instructs the deputy image content distributing apparatus 230 to distribute the image content MC (ST44).

Then, the viewer information UI is inquired from the deputy image content distributing apparatus 230 to the image content reproducing apparatus 400 (ST45) and the viewer information UI is transmitted from the image content reproducing apparatus 400 to the deputy image content distributing apparatus 230 (ST46). At this occasion, when the image content MC is distributed under, for example, a membership system, the viewer information UI is not inquired, the viewer ID is inquired, the viewer ID is checked with the viewer information database 215 and the viewer information UI is extracted.

Then, in the deputy image content distributing apparatus 230, the image content MC to be distributed is selected from the image content database 212 and the image content MC is subjected to stream distribution to the image content reproducing apparatus 400. At this occasion, based on the advertisement inserting condition data CID, the advertisement inserting position in the image content MC is scanned by the image providing means 213 (ST47).

Further, when the advertisement inserting position is detected the advertisement image providing apparatus 300 is requested distribute the advertisement CM (ST48). At this occasion, the advertisement image providing apparatus 300 is transmitted with the advertisement in setting condition data CID, the viewer information UI and the distributor ID along with request of distributing the advertisement image CM.

Then, in the advertisement image providing apparatus 300, based on the transmitted advertisement inserting condition data CID, the transmitted viewer information UI and the transmitted advertisement selecting condition CMC, the advertisement image CM to be distributed a selected by the advertisement image selecting means 313. Further, the selected advertisement image CM is subjected to stream distribution from the advertisement image providing means 314 to the deputy image content distributing apparatus 230 (ST49).

The distributed advertisement image CM is inserted to the advertisement inserting position in the image content MC and is subjected to stream distribution to the image content reproducing apparatus 400 (ST50). Further, when the stream distribution of the advertisement image CM has been finished, the deputy image content distributing apparatus 230 restarts to distribute the image content MC (ST51).

In this way, when the image content MC is distributed to the image content reproducing apparatus 400, even in the case of using the deputy image content distributing apparatus 230, the advertisement image CM can be inserted to the image content MC. Further, by distributing the image content MC and the advertisement image CM by the deputy image content distributing apparatus 230, the image content MC and the advertisement image CM can be provided to the image content reproducing apparatus 400 at high speed.

Fifth Embodiment

Case of Multicast Stream Distribution

Figure 19:
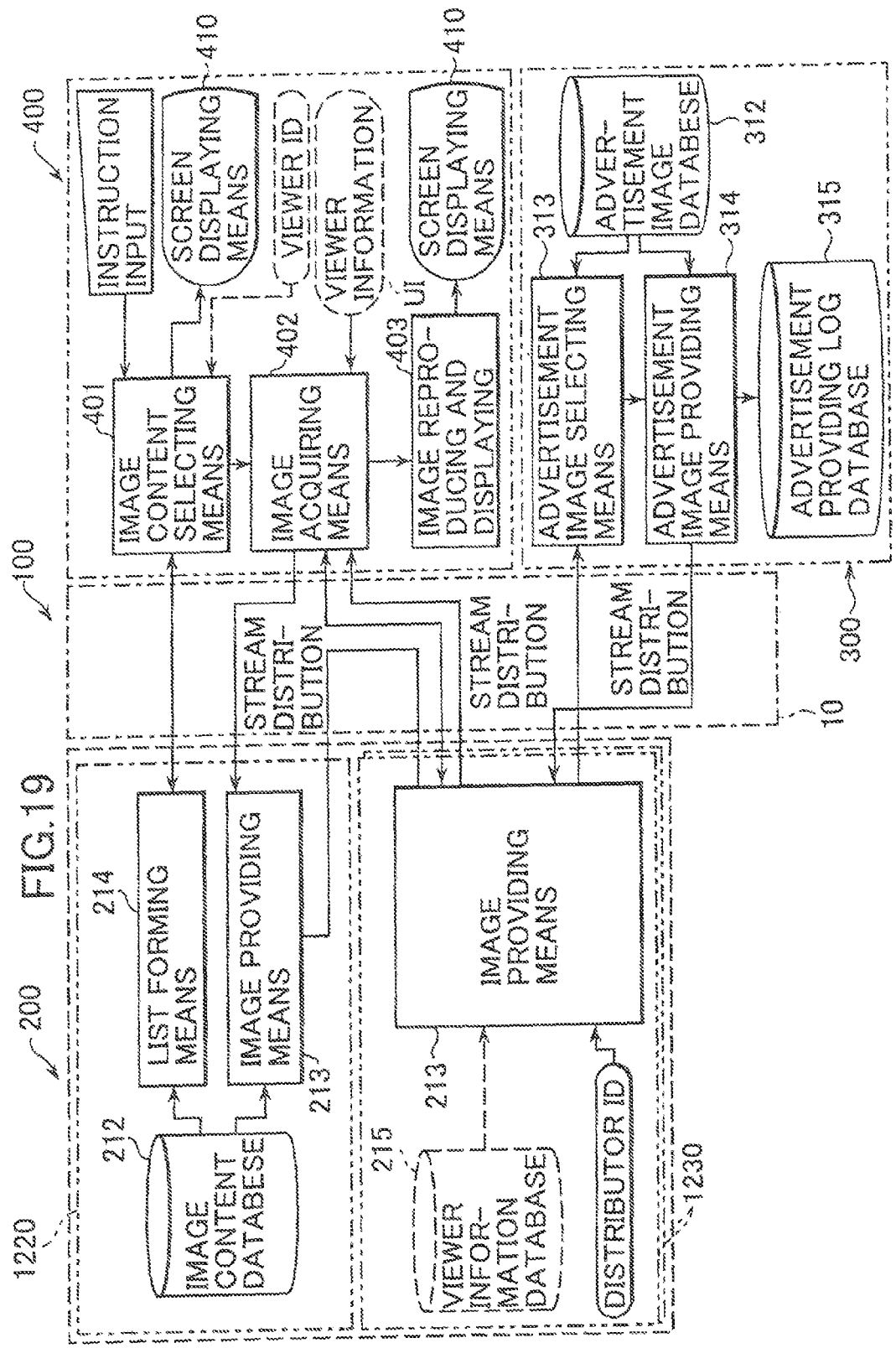
FIG. 19 is a block diagram showing a fifth embodiment of an image content providing system according to the invention.
Figure 20:
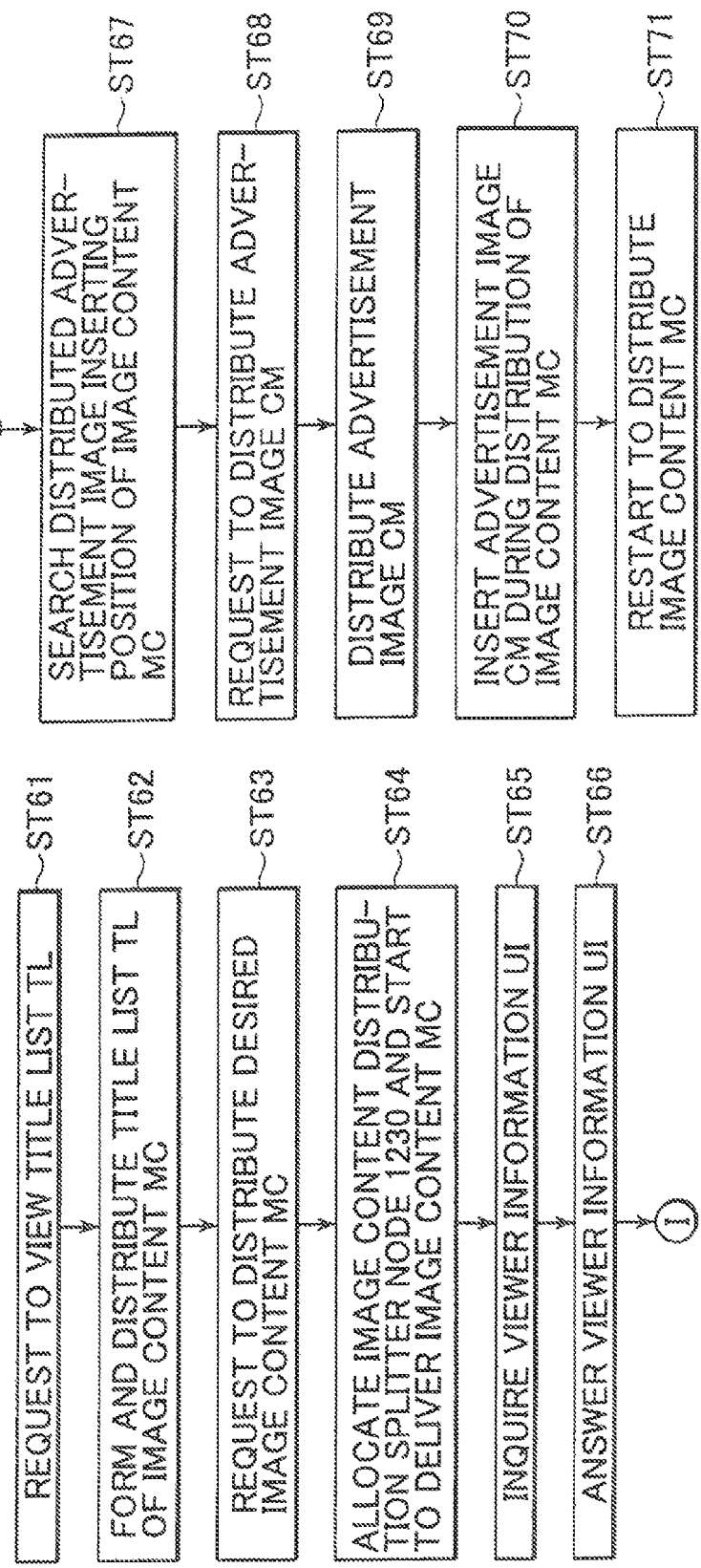
FIG. 20 is a flowchart showing the fifth embodiment of the image content providing method.

FIG. 19 is a block diagram showing fifth embodiment of an image content providing system according to the invention, FIG. 20 is a flowchart showing fifth embodiment of an image content providing method according to the invention, respectively, and an explanation will be given of an image content providing method in reference to FIG. 19 and FIG. 20. Further, FIG. 19 and FIG. 20 refers to a case of so-to-speak multicast stream distribution in which the image content MC is distributed by a plurality of image content distribution splitter nodes.

In this case, the image content providing system 100 of FIG. 19 includes a main image content distributing apparatus 1220 and a plurality of image content distribution splitter nodes 1230. The main image content distributing apparatus 1220 receives distribution request mainly from the image content reproducing apparatus 400 and the image content distribution splitter node 1230 distributes the image content MC mainly to the image content reproducing apparatus 400. Further, the image content distribution splitter node 1230 is not provided with the image content database 212 and therefore, the image content distribution splitter node 1230 distributes the image content MC distributed from the main image content distributing apparatus 1220 to the side of the image content reproducing apparatus 400.

First, by instruction input of a viewer of FIG. 19, the title list is requested from the image content reproducing apparatus 400 to the image content providing apparatus 200 (ST61). Then, the title list extracting title IT1 are formed by the title list forming means 214 in the main image content distributing apparatus 200. Further, the formed title list is transmitted from the title list forming means 214 to the image content reproducing apparatus 400 (ST62).

Next, based on the title list transmitted from the image content reproducing apparatus 400, there is selected the image content MC which the user intends to utilize. Thereafter the desired image content MC is requested to distribute from the image acquiring means 402 to the image content providing apparatus 200 (ST63).

Then, the main image content distributing apparatus 1220 allocates the image content distribution splitter node 230 which is, for example, most proximate to the image content reproducing apparatus 400 among the plurality of image content distribution splitter nodes 230. Thereby, the image content MC can be distributed to the viewer at high speed. Further, the requested image content MC and the advertisement inserting condition CID are delivered from the image content providing apparatus 200 to the allocated image content distribution splitter node 1230 (ST64).

During a time period in which the image content MC is being delivered, the selected image content distribution splitter node 1230 requests the image content reproducing apparatus 400 to distribute the viewer information UI (ST65). Then, the viewer information UI is distributed from the image content reproducing apparatus 400 to the image content distribution splitter node 1230 (ST66). At this occasion, when the image content MC is distributed under, for example, a membership systems, the viewer information UI is not inquired, the viewer ID is inquired, the viewer ID is checked with the viewer information database 215 and the viewer information UI is extracted.

Further, the image content MC is subjected to stream distribution from the image content distribution splitter node 123 to the image content reproducing apparatus 400 (ST67). At this occasion, based on the advertisement inserting condition data CID, the advertisement inserting position in the image content MC is scanned by the image providing means 213.

Further, when the advertisement instructing position has been detected, the advertisement image providing apparatus 300 is requested to distribute the advertisement image CM (ST68). At this occasion, the advertisement image providing apparatus 300 is transmitted with the advertisement inserting condition data CID and the viewer information UI along with request of distributing the advertisement image CM.

Then, in the advertisement image providing apparatus 300, based on the transmitted advertisement inserting condition data CID, the transmitted viewer information UI and the transmitted advertisement selecting condition CMC, the advertisement image CM to be distributed is selected by the advertisement image selecting means 313. Further, the selected advertisement image CM is subjected to stream distribution from the advertisement image providing means 314 to the image content distribution splitter node 1230 (ST69).

The distributed advertisement image CM is inserted to the advertisement inserting position in the image content MC and is subjected to stream distribution to the image content reproducing apparatus 400 (ST70). Further, when the stream distribution of the advertisement image CM has been finished, the image content distribution splitter node 1230 restarts to distribute the image content MC (ST71).

In this way, when the image content MC is distributed to the image content reproducing apparatus 400, even in the case of using the image content distribution splitter node 1230, the advertisement image CM can be inserted to the image content MC. Further, by distributing the image content MC and the advertisement image CM by the image content distribution splitter node 1230, the image content MC and the advertisement image CM can be provided to the image content reproducing apparatus 400 at high speed.

Meanwhile, when the advertisement image CM is inserted to the image content MC as in the above-described image content providing method, there is produced advertisement insertion charge by inserting the advertisement image CM to the image content MC at the owner of the image content MC. Further, as described above, there is a case in which the advertisement image CM is distributed by the image content providing apparatus 200 and therefore, there is produced advertisement distribution charge by distributing the advertisement image CM to the image distributor. Further, advertisement charge by distributing the advertisement image CM is produced at the advertiser.

In this case, according to the above-described respective embodiments, there is a case in which the advertisement image CM is distributed to a viewer from the image content providing apparatus 200 or from the advertisement image providing apparatus 300. Therefore, it is necessary to unitarily control to totalize the advertisement charge, the advertisement distribution charge and the advertisement insertion charge.

Figure 21:
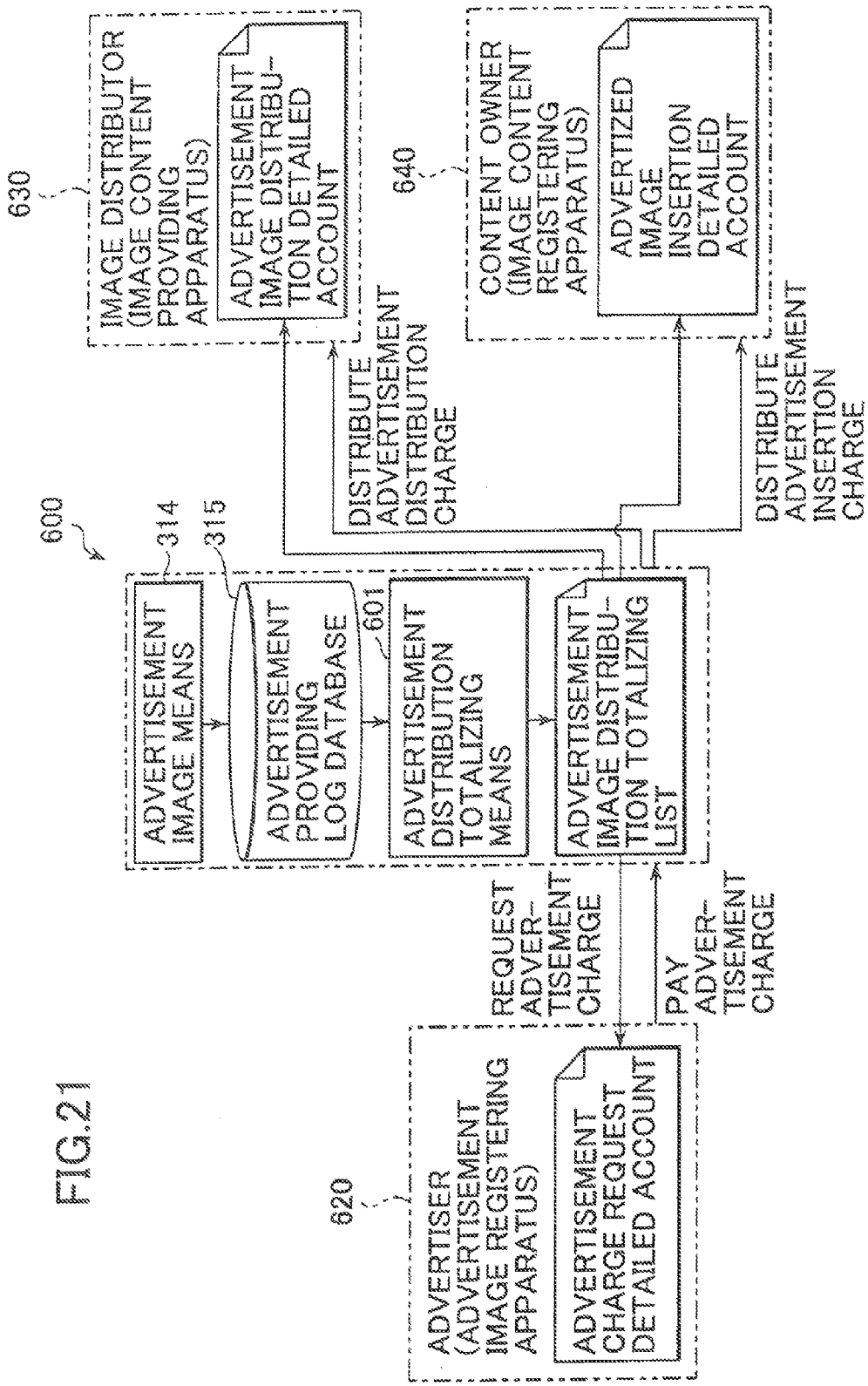
FIG. 21 is a block diagram showing a preferable embodiment of an advertisement charge totalizing system according to the invention.

FIG. 21 is a block diagram showing an example of an advertisement charge totalizing system according to the invention and an explanation will be given of an advertisement charge totalizing system 600 in reference to FIG. 21.

The advertisement totalizing system 600 is constructed in, for example, the advertisement image providing apparatus 300 and is managed by for example, the advertisement image distributor. An image content distributor 630 is an enterprise managing the image content providing apparatus 200 of FIG. 1 and a content owner 640 is an owner of the image content MC registered to the image content providing apparatus 200.

In the advertisement charge totalizing system 600, advertisement provision log totalizing means 601 is provided with a function of totalizing advertisement provision log SL of the advertisement position log database 315 and totalizing the advertisement charge, the advertisement distribution charge and the advertisement insertion charge. Further, as shown by FIG. 9, the advertisement provision log SL is constituted by, for example, distribution day/hour, the distributor ID, the content owner ID, the title, the category of the image content MC, gender, generation, occupation and area of the viewer.

In this case, the advertisement provision log totalizing means 601 specifies the distributing advertiser and a number of times of distribution based on the advertisement image ID in the advertisement vision log SL and totalizes the advertisement charge to be charged to the advertiser 620. Further, the advertisement provision log totalizing means 601 totalizes the advertisement distribution charge to be distributed to the image content distributor based on the distributor ID in the advertisement provision log SL. Further, the advertisement provision log totalizing means 601 totalizes the advertisement insertion charge to be distributed to the content owner based on the content owner ID of the advertisement provision log SL. Further, the advertisement provision log totalizing means 601 totalizes the advertisement distribution commission to be distributed to the advertisement image distributor based on a number of she advertisement image ID of the advertisement provision log SL.

Further, based on a totalized result, the image content owner, the image content distributor and the advertisement image distributor, are respectively distributed with the advertisement insertion charge, the advertisement distribution charge and the advertisement distribution commission. Meanwhile the advertisement charge is charged to the advertiser.

In this way, even when distribution destination of the image advertisement CM is either of the image context providing apparatus 200 and the image content reproducing apparatus 400, the advertisement charge is charged based on the advertisement provision log SL and therefore, the advertisement charge and the like can be calculated easily. Further, even when the number of times of distributing the image advertisement CM differs by the advertiser, the advertisement charge can be calculated based on the advertiser ID of the advertisement provision log SL and accordingly, the advertisement charge and the like can easily be totalized.

According to the above-described respective embodiments, when the distributed image content MC such as movie is reproduced by utilizing the network 10 of the internet, the advertisement image CM can dynamically be inserted to head, tail or middle of an image. Thereby, effective advertisement or propaganda can be carried out and the content owner or the distributor can obtain advertisement income. That is, by providing the advertisement image in a state in which the advertisement image is not separate from the image content as in banner advertisement but is inserted to the image content MC by the image content providing apparatus 200, the viewer is easy to turn one's eyes to the advertisement image CM and promotion of advertisement effect can be achieved.

Further, the advertisement image CM is reproduced by the image reproducing means 403 for reproducing the image content MC and therefore, the quality level of the advertisement image CM can be promoted and advertisement effect can be promoted.

Further, it is not necessary for the advertiser to select a sponsored program (image content MC) and therefore, efficiency of operation for distributing the advertisement image can be achieved. Further, the advertisement image CM is distributed based on the viewer information UI and therefore, the advertiser can carry out effective advertisement and propaganda to a viewer constituting a target. Further, when the advertiser intends to update content of the advertisement image CM, the advertisement image CM in the advertisement image providing apparatus 300 may only be updated and it is not necessary to respectively distribute the advertisement image CM to the respective image content providing apparatus (image distributors) as in the conventional case. In this way, by unitarily controlling the advertisement image CM by the advertisement image providing apparatus 300, control of the advertisement image CM is facilitated.

Further, it is net necessary for the image content owner to carry out an activity of so-to-speak sponsor invitation since the advertisement image CM is inserted automatically when the advertisement inserting condition CID is set. Therefore, the image content owner can pay attention to production of image. Further, the image content owner can obtain the advertisement insertion charge by distributing the image content and therefore, the image content can broadly be distributed from image production companies to individuals and can expedite to circulate the image content MC on the network such as the internet.

Further the image content MC is distributed when a viewer requests to distribute thereof and accordingly, it is not necessary for the image distributor to schedule to transmit image as in a conventional television broadcast station and alleviation of operation of transmitting image can be achieved. Further, as described above, when the image content is transmitted to the side of the image content reproducing apparatus 400 (side of viewer), various methods can be utilized and therefore, circulation of the image content MC can be achieved in a mode which is easy to deal with mostly for a viewer and an image distributor.

Further, different from that the image content MC can be utilized unless a specific time band is constituted as in the conventional television broadcasting, the image content MC can be obtained when a viewer requests to distribute thereof. Therefore, the availability of the image content MC by the viewer can be promoted. Further, the advertisement image CM inserted to the image content MC is selected based on the viewer information UI and therefore only the advertisement image CM which is interesting for the viewer can be browsed.

Further, by the advertisement charge totalizing system 600 as shown by FIG. 21, collection and distribution of charge is unitarily controlled by the advertisement image providing apparatus 300. Therefore, collection and distribution of the advertisement charge can easily be carried out. Further, the advertiser 620 may only pay charge for an amount of the distributed advertisement image and the advertisement image CM can be distributed efficiently. Further, the advertisement insertion charge and the advertisement distribution charge are totalized based on the advertisement provision log SL and therefore, even when the image content owner 640 and the image distributor 630 do not provide the advertisement image CM directly to the viewer, the advertisement insertion charge and the advertisement distribution charge are distributed firmly.

The embodiments of the present invention are not limited to the above-described respective embodiments.

For example, although the image content providing apparatus 200 of FIG. 2 is managed by, for example, the image distributor and the image content registering apparatus 20 is managed by, for example, the image content owner, these may be managed by the same enterprise or an individual.

Similarly, although the advertisement image providing apparatus 300 of FIG. 2 is managed by, for example, the advertisement image distributor and the advertisement image registering apparatus 30 is managed by, for example, the advertiser, these may be managed by the same enterprise or individual.

Further, the image content providing apparatus 200, the advertisement image providing apparatus 300 and the image content reproducing apparatus 400 as in FIG. 1, are constituted by using, for example, hardware resources of personal computers and are realized by executing programs stored to auxiliary storing apparatus such as hard disk apparatus by CPU (Central Processing Unit). Further, as a program storing medium used for installing programs for executing the following series of processes to computers and bringing the programs into an executable state by the computers, the program storing medium may be realized not only by a package media such as floppy disk, CD-ROM, DVD but also a semiconductor memory or a magnetic disk stored temporarily or perpetually with the program. As means for storing programs to the program storing media, there may be utilized wired and wireless communication media such as a local area network, internet or digital satellite broadcasting and may be stored by interposing various communication interfaces such as router or modem.

Further, the program for providing the image content is an authored software capable of relating the image content MC with the advertisement inserting condition CID and the title information IT and the program stored with the program for providing the advertisement image is an authored software capable of relating, for example, the advertisement image CM, the advertisement selecting condition CMC and the advertisement information CMI.

What is claimed is:

1. A contents streaming and advertisement data providing server comprising:
    communication circuitry configured to
        (a) receive viewer information from a first terminal when the contents streaming and advertisement data providing server receives a streaming request from the first terminal, and
        (b) receive from a second terminal different from the first terminal via a network,
            (1) content data,
            (2) an ID of an owner of the content data,
            (3) a title of the content data, and
            (4) insertion position information for advertisement data, wherein the insertion position information being associated with the content data and specified by the owner of the content data; and
        (c) receive a user designation of user desired content data; and,
    a controller configured to
        (a) extract advertisement conditional information,
        (b) extract advertisement data from an advertisement database based on the received viewer information and the extracted advertisement conditional information, and
        (c) control the communication circuitry to
            (1) stream the desired content data to the first terminal,
            (2) suspend the streaming of the desired content data based on the received insertion position information,
            (3) start the streaming of the extracted advertisement data to the first terminal instead of the transmission of the desired content data, and
            (4) restart the streaming of the desired content data to the first terminal after the streaming of the extracted advertisement data is finished, the controller further configured to
    store, in a log database, a log having a distribution record of the extracted advertisement data, the log including the ID of the owner of the content data, wherein the ID of the owner of the content data is different from an ID of the owner of advertisement data.

2. The server according to claim 1, wherein the insertion position information represents a timing of switching a scene in the desired content data.

3. The server according to claim 1, wherein the controller further configured to
    extract category information for advertisement data from a database, and wherein
    the extraction of the advertisement data is based on the received viewer information, the extracted advertisement conditional information and the extracted category information.

4. The server according to claim 1, wherein the communication circuitry configured to store, in a content database, an ID of the received content data in association with the content data, the received ID of the owner of the content data, the title of the content data and the insertion position information for advertisement data.

5. A contents streaming and advertisement data providing method comprising the steps of:
    receiving viewer information from a first terminal when the contents streaming and advertisement data providing server receives a streaming request from the first terminal;
    receiving from a second terminal different from the first terminal via a network,
        (1) content data,
        (2) an ID of an owner of the content data,
        (3) a title of the content data, and
        (4) insertion position information for advertisement data, wherein the insertion position information being associated with the content data and specified by the owner of the content data;
    receiving a user designation of user desired content data;
    extracting advertisement conditional information;
    extracting advertisement data from an advertisement database based on the received viewer information and the extracted advertisement conditional information;
    streaming the desired content data to the first terminal;
    suspending the streaming of the desired content data based on the received insertion position information;
    starting the streaming of the extracted advertisement data to the first terminal instead of the transmission of the desired content data;
    restarting the streaming of the desired content data to the first terminal after the streaming of the extracted advertisement data is finished and
    storing, in a log database, a log having a distribution record of the extracted advertisement data, the log including the ID of the owner of the content data, wherein the ID of the owner of the content data is different from an ID of the owner of advertisement data.

6. The method according to claim 5, wherein the insertion position information represents a timing of switching a scene in the desired content data.

7. The method according to claim 5, further comprising the step of:
    extracting category information for advertisement data from a database, and wherein the extraction of the advertisement data is based on the received viewer information, the extracted advertisement conditional information and the extracted category information.

8. The method according to claim 5, further comprising storing, in a content database, an ID of the received content data in association with the content data, the received ID of the owner of the content data, the title of the content data and the insertion position information for advertisement data.

9. A non-transitory computer readable medium embodied with a contents streaming and advertisement data providing computer program comprising the steps of:
- receiving viewer information from a first terminal when the contents streaming and advertisement data providing server receives a streaming request from the first terminal;
- receiving from a second terminal different from the terminal via a network,
  (1) content data,
  (2) an ID of an owner of the content data,
  (3) a title of the content data, and
  (4) insertion position information for advertisement data, wherein the insertion position information being associated with the content data and specified by the owner of the content data;
- receiving a user designation of user desired content data;
- extracting advertisement conditional information;
- extracting advertisement data from an advertisement database based on the received user profile and the extracted advertisement conditional information;
- streaming the desired content data to the first terminal;
- suspending the streaming of the desired content data based on the received insertion position information;
- starting the streaming of the extracted advertisement data to the first terminal instead of the transmission of the desired content data;
- restarting the streaming of the desired content data to the first terminal after the streaming of the extracted advertisement data is finished; and
- storing, in a log database, a log having a distribution record of the extracted advertisement data, the log including the ID of the owner of the content data, wherein the ID of the owner of the content data is different from an ID of the owner of advertisement data.

10. The medium according to claim 9, wherein the insertion position information represents a timing of switching a scene in the desired content data.

11. The medium according to claim 9, further comprising:
extracting category information for advertisement data from a database, and wherein
the extraction of the advertisement data is based on the received viewer information, the extracted advertisement conditional information and the extracted category information.

12. The medium according to claim 9, further comprising storing, in a content database, an ID of the received content data in association with the content data, the received ID of the owner of the content data, the title of the content data and the insertion position information for advertisement data.

* * * * *